(12) United States Patent
Nadella et al.

(10) Patent No.: US 8,092,626 B2
(45) Date of Patent: Jan. 10, 2012

(54) FOAMING METHODS FOR MAKING CELLULAR THERMOPLASTIC MATERIALS

(75) Inventors: Krishna V. Nadella, Seattle, WA (US); Dustin Miller, Seattle, WA (US); Vipin Kumar, Seattle, WA (US); William F. Kuykendall, Seattle, WA (US); Stephen Probert, Flagstaff, AZ (US)

(73) Assignee: University of Washington, Seattle, WA (US)

( * ) Notice: Subject to any disclaimer, the term of this patent is extended or adjusted under 35 U.S.C. 154(b) by 950 days.

(21) Appl. No.: 12/047,263

(22) Filed: Mar. 12, 2008

(65) Prior Publication Data

US 2009/0065136 A1    Mar. 12, 2009

Related U.S. Application Data

(60) Provisional application No. 60/894,440, filed on Mar. 12, 2007.

(51) Int. Cl.
*B29C 65/02* (2006.01)
*B32B 5/20* (2006.01)

(52) U.S. Cl. ............. 156/79; 264/45.1; 264/51; 264/52

(58) Field of Classification Search ............ 264/51, 264/52

See application file for complete search history.

(56) References Cited

U.S. PATENT DOCUMENTS

| | | | |
|---|---|---|---|
| 3,147,514 A | 9/1964 | Reilly | |
| 3,155,756 A | 11/1964 | Hechelhammer | |
| 3,437,536 A * | 4/1969 | Vincent et al. | 156/78 |
| 3,501,807 A | 3/1970 | Selbach | |
| 4,066,401 A | 1/1978 | Solomon | |
| 4,272,469 A | 6/1981 | Smith | |
| 4,473,665 A | 9/1984 | Martini-Vvedensky | |
| 4,510,106 A | 4/1985 | Hirsch | |
| 4,545,105 A * | 10/1985 | Kowalsky | 29/469.5 |
| 4,668,484 A | 5/1987 | Elliott | |
| 5,174,934 A * | 12/1992 | Saatchi | 264/46.4 |
| 5,482,678 A | 1/1996 | Sittler | |
| 5,684,055 A * | 11/1997 | Kumar et al. | 521/79 |
| 6,177,181 B1 | 1/2001 | Hamada | |
| 6,218,458 B1 | 4/2001 | Vidaurre | |

(Continued)

FOREIGN PATENT DOCUMENTS

DE    19955171 A1    5/2001

(Continued)

OTHER PUBLICATIONS

International Search Report and Written Opinion of the International Search Authority dated Mar. 23, 2009, in related International Application No. PCT/US20081056734, filed Mar. 12, 2008.
International Search Report and Written Opinion of the International Search Authority dated Mar. 23, 2009, in related International Application No. PCT/US2008/056738, filed Mar. 12, 2008.
Kumar, V., et al., "Production of Thick Microcellular Thermoplastic Sheets for Load Bearing Applications," Proceedings of the Polymer and Supercritical Fluid Processing Conference, Tokyo, Dec. 4-6, 2003.

(Continued)

*Primary Examiner* — John L. Goff
*Assistant Examiner* — Barbara J. Musser
(74) *Attorney, Agent, or Firm* — Christensen, O'Connor, Johnson, Kindness, PLLC

(57) ABSTRACT

Methods for reducing the density of thermoplastic materials and the articles made therefrom having similar or improved mechanical properties to the solid or noncellular material. Also disclosed are improvements to foaming methods and the cellular structures of the foams made therefrom, and methods for altering the impact strength of solid or noncellular thermoplastic materials and the shaping of the materials into useful articles.

10 Claims, 23 Drawing Sheets

U.S. PATENT DOCUMENTS

| | | | |
|---|---|---|---|
| 6,379,962 | B1 | 4/2002 | Holy |
| 6,391,934 | B1 | 5/2002 | Handa |
| 6,399,669 | B1 | 6/2002 | Suzuki |
| 6,426,372 | B1 | 7/2002 | Minami |
| 6,503,427 | B1 | 1/2003 | Yamamoto |
| 6,613,172 | B1 * | 9/2003 | Tsujimoto et al. ............... 156/78 |
| 6,706,346 | B2 | 3/2004 | Tsumiyama |
| 7,622,129 | B1 | 11/2009 | Haberstroh |
| 2002/0005600 | A1 | 1/2002 | Ma |
| 2002/0168509 | A1 | 11/2002 | DeSimone |
| 2003/0176636 | A1 | 9/2003 | Liesenfelder |
| 2004/0080070 | A1 | 4/2004 | Liu |
| 2004/0082276 | A1 | 4/2004 | Prasad |
| 2008/0274346 | A1 | 11/2008 | Miller |
| 2008/0277817 | A1 | 11/2008 | Miller |
| 2008/0280123 | A1 | 11/2008 | Miller |

FOREIGN PATENT DOCUMENTS

| | | | |
|---|---|---|---|
| EP | 1219672 A1 | | 7/2002 |
| GB | 1154965 A | | 6/1969 |
| JP | 402122906 A | | 5/1990 |
| JP | 04138246 A | * | 5/1992 |
| JP | 11170288 A | * | 6/1999 |
| JP | 2004091695 A | | 3/2004 |

OTHER PUBLICATIONS

Li, W., et al., "Manufacturing of Micro-Scale Open-Cell Polymeric Foams Using the Solid-State Foaming Process," Transaction of North American Manufacturing Research Institution of Society of Manufacturing Engineers (SME), vol. 31, 2003, pp. 271-378.

Liu, T., et al., "Nanoporous Polymer Films From Immiscible Polymer Blends: Pore Size and Composition Dependence," Materials Research Society Symposium Proceedings 856E:103-108, 2005.

Mehta, F., and K. Nadella, "Prediction of Density Variation in Thick Microcellular Sheets," Course Project Report ME 599 VK, Autumn 2003, presented at the Society of Plastics Engineers (SPE) Annual Technical Conference (ANTEC) 2:2610-2614, 2004.

Nadella, K., et al., "Constrained Solid-State Foaming of Microcellular Panels," Cellular Polymers 24(2):71-90, 2005.

Nadella, K., et al., "Novel Microcellular Plastics for Lightweight and Energy Efficient Building Applications," in M. Anson et al. (eds.), "Advances in Building Technology," vol. 1, Elsevier Science Ltd., Hong Kong, 2002, pp. 121-128.

Nadella, K., et al., "Prediction of Density Variation in Thick Microcellular Sheets," presented at the Society of Plastics Engineers (SPE) Annual Technical Conference (ANTEC), Chicago, May 16-20, 2004.

Nadella, K., et al., "Thick Microcellular Thermoplastic Sheets for Construction and Other Load-Bearing Applications," Proceedings of Foams Conference, Wilmington, Del., Oct. 2004, 9 pages.

Nawaby, A.V., et al., "Polymer-$CO_2$ Systems Exhibiting Retrograde Behavior and Formation of Nanofoams," Polymer International 56:67-73, 2007.

Pasricha, A., et al., "Effect of $CO_2$ Sorption and Desorption on the Creep Response of Polycarbonate," Polymer Engineering and Science 45(12):1639-1644, Oct. 2005.

Rachtanapun, P., et al., "Cell Morphology and Impact Strength of Microcellular Foamed HDPE/PP Blends," Proceedings of the Society for Plastic Engineers (SPE) Annual Technical Conference (ANTEC), 2003, pp. 1762-1766. also published in Polymer Engineering and Science 44(8):1551-1560, 2004.

Seeler, K., and V. Kumar, "Decoupling the Effects of the Matrix Properties and Foam Structure on the Mechanical Properties of Microcellular Foam by Sub-Tg Annealing," Journal of Reinforced Plastics and Composites 14:1054-1068, Oct. 1995.

Seeler, K., and V. Kumar, "Effect of $CO_2$ Saturation and Desorption on the Fatigue Life of Polycarbonate," Journal of Engineering Materials and Technology 116(4):451-456, Oct. 1994.

Seeler, K.A., and V. Kumar, "Tension-Tension Fatigue of Microcellular Polycarbonate: Initial Results," Journal of Reinforced Plastics and Composites 12(3):359-376, Mar. 1993.

Szymanski, W.W., "Optical Behavior of Fine Bubbles—Possibility of Real Time Size Characterization," Journal of Aerosol Science 27(Suppl 1):537-538, Sep. 1996.

Waldman, F.A., "The Processing of Microcellular Foam," master's thesis, Massachusetts Institute of Technology, Cambridge, Mass., Jan. 1982.

Zhang, Z., and Y.P. Handa, "An In Situ Study of Plasticization of Polymers by High-Pressure Gases," Journal of Polymer Science: Part B: Polymer Physics 36(6):977-982, 1998.

Partial International Search Report mailed Oct. 21, 2008, in corresponding PCT/US2008/056730, filed Mar. 12, 2008.

Baldwin, D.F., et al., "Microcellular Sheet Extrusion System Process Design Models for Shaping and Cell Growth Control," Polymer Engineering and Science 38(4):674-688, Apr. 1998.

Barlow, C., et al., "Impact Strength of High Density Solid-State Microcellular Polycarbonate Foams," Journal of Engineering Materials and Technology 123(2):229-233, Apr. 2001.

Chatchaisucha, P., and V. Kumar, "Micro and Nano Scale Solid-State PEI Foams," presented at the Society of Plastics Engineers (SPE) Annual Technical Conference (ANTEC), Charlotte, N.C., May 7-11, 2006.

Doroudiani, S., and M.T. Kortschot, "Polystyrene Foams. II. Structure-Impact Properties Relationships," Journal of Applied Polymer Science 90:1421-1426, 2003.

Hedrick, J.L., et al., "High Temperature Nanofoams Derived From Rigid and Semi-Rigid Polyimides," Polymer 36(14):2685-2697, 1995.

Hedrick, J.L., et al., "High Tg Polyimide Nanofoams Derived From Pyromellitic Dianhydride and 1,1-Bis(4-aminophenyl)-1-phenyl-2,2,2-trifluoroethane," Journal of Polymer Science: Part A: Polymer Chemistry 34:2867-2877, 1996.

Holl, M.R., et al., "A Steady-State Mass Balance Model of the Polycarbonate-$CO_2$ System Reveals a Self-Regulating Cell Growth Mechanism in the Solid-State Microcellular Process," Journal of Polymer Science: Part B: Polymer Physics 39(8):868-880, Apr. 2001.

Hsiao, S.-H., and T.-L. Huang, "Synthesis and Properties of Poly(ether imide)s Based on a Benzonorbornane Bis(ether anhydride)," Journal of Polymer Science: Part A: Polymer Chemistry 40:1712-1725, 2002.

Juntunen, R.P., et al., "Impact Strength of High Density Microcellular Poly(Vinyl Chloride) Foams," Journal of Vinyl and Additive Technology 6(2):93-99, Jun. 2000.

Krause, B., et al., "Bicontinuous Nanoporous Polymers by Carbon Dioxide Foaming," Macromolecules 34(25):8792-8801, 2001.

Krause, B., et al., "Open Nanoporous Morphologies From Polymeric Blends by Carbon Dioxide Foaming," Macromolecules 35(5):1738-1745, 2002.

Kumar, V., "Microcellular Plastics: Does Microcellular Structure Always Lead to an Improvement in Impact Properties?" presented at the Society of Plastics Engineers (SPE) Annual Technical Conference (ANTEC 2002), San Francisco, Calif., May 2002.

Kumar, V., "Microcellular Polymers: Novel Materials for the 21st Century," Progress in Rubber and Plastics Technology 9(1):54-70, 1993.

Kumar, V., and J.E. Weller, "A Model for the Unfoamed Skin on Microcellular Foams," Polymer Engineering and Science 34(3):169-173, Feb. 1994.

Kumar, V., and K.V. Nadella, "Microcellular Foams" (draft), Chapter 10 in D. Eaves (ed.), "Handbook on Polymer Foams," RAPRA Technology, Shrewsbury, Shropshire, U.K., 2004.

Kumar, V., et al., "Production of Thick Microcellular Thermoplastic Sheets," presented at the Society of Plastics Engineers (SPE) Annual Technical Conference, Nashville, Tennessee, May 4-8, 2003.

Invitation to Pay Additional Fees and Partial International Search Report dated Jan. 9, 2009, in related PCT/US2008/056738, filed Mar. 12, 2008.

Invitation to Pay Additional Fees and Partial International Search Report dated Jan. 9, 2009, in related PCT/US2008/056734, filed Mar. 12, 2008.

* cited by examiner

FOAMING METHODS FOR MAKING CELLULAR THERMOPLASTIC MATERIALS

CROSS-REFERENCE TO RELATED APPLICATION

This application claims the benefit of U.S. Provisional Application No. 60/894,440, filed on Mar. 12, 2007, which is fully incorporated herein expressly by reference.

STATEMENT OF GOVERNMENT LICENSE RIGHTS

This invention was made with Government support under CMS0122055 awarded by National Science Foundation. The Government has certain rights in the invention.

BACKGROUND

Solid thermoplastic materials have many uses and applications. In almost all uses and applications, materials are chosen based on mechanical properties that satisfy the requirements of the use and application. Oftentimes, the constraints of the mechanical properties limit the selection of materials that are suitable. Weight is also often a consideration that goes into the selection of the materials used in a particular application.

Generally, a material that is lighter in weight and that possesses the required mechanical properties will be favored over another material with similar properties and is higher in weight.

SUMMARY

Accordingly, in view of the above considerations, disclosed herein are methods for reducing the density of thermoplastic materials and the articles made therefrom having similar or improved mechanical properties to the solid or noncellular material. Also disclosed are improvements to foaming methods and the cellular structure of the foams made therefrom, and methods for altering the impact strength of solid or noncellular thermoplastic materials and the shaping of the materials into useful articles.

In one embodiment, a method for decreasing the density of a thermoplastic material without substantially reducing the light transmissivity of the thermoplastic material is provided. The method includes obtaining a thermoplastic material having an initial density; and forming cells in the material that have an average cell size of 0.1 nm to 100 nm to produce a thermoplastic material of lesser density than the initial density and having a light transmissivity of at least 20%.

In a second embodiment, a cellular thermoplastic material prepared from a solid thermoplastic material is provided. The cellular thermoplastic material includes nano-sized cells having an average size of 0.1 nm to 100 nm; a density lower than the density of the solid thermoplastic material; and a light transmissivity of at least 20%.

In a third embodiment, a method for decreasing the density of a thermoplastic material without substantially reducing the impact strength of the thermoplastic material is provided. The method includes obtaining a thermoplastic material having an initial density and initial impact strength; and forming cells in the material that have an average cell size of 0.1 nm to 100 nm to produce a thermoplastic material of lesser density than the initial density and having an impact strength substantially the same as or greater than the initial impact strength.

In a fourth embodiment, a cellular thermoplastic material prepared from a solid thermoplastic material is provided. The cellular thermoplastic material includes nano-sized cells having an average cell size of 0.1 nm to 100 nm; a density lower than the density of the solid thermoplastic material; and an impact strength substantially the same as or greater than the impact strength of the solid thermoplastic material.

In a fifth embodiment, a method for decreasing the density of a thermoplastic material without substantially reducing the elongation of the thermoplastic material is provided. The method includes obtaining a thermoplastic material having an initial density and an initial elongation; and forming cells in the material that have an average cell size from 0.1 nm to 100 nm to produce a thermoplastic material of lesser density than the initial density and having an elongation that is substantially the same as the initial elongation.

In a sixth embodiment, a cellular thermoplastic material prepared from a solid thermoplastic material is provided. The cellular thermoplastic material includes nano-sized cells having an average cell size of 0.1 nm to 100 nm; a density lower than the density of the solid thermoplastic material; and an elongation that is substantially the same as the elongation of the solid thermoplastic material.

In a seventh embodiment, a method for filtering light is provided. The method includes directing light at a thermoplastic material with nano-sized cells having an average cell size of 0.1 nm to 100 nm, wherein the size of the cells determines the wavelength of light that is filtered by the thermoplastic material.

In an eighth embodiment, a light filter is provided. The light filter includes a thermoplastic material comprising nano-sized cells having an average cell size of 0.1 nm to 100 nm, wherein the size of the cells determines the wavelength of light that is filtered.

In a ninth embodiment, a method for making a light filter is provided. The method includes forming nano-sized cells having an average cell size of 0.1 nm to 100 nm in a thermoplastic material, wherein the size of the cells determines the wavelength of light that is filtered.

In a tenth embodiment, a method for providing color to a thermoplastic material is provided. The method includes forming nano-sized cells having an average cell size of 0.1 nm to 100 nm in a thermoplastic material, wherein the size of the cells determines the color of the thermoplastic material.

In an eleventh embodiment, a colored thermoplastic material is provided. The colored thermoplastic material includes nano-sized cells having an average size of 0.1 nm to 100 nm, wherein the size of the cells determines the color of the thermoplastic material.

In the first through eleventh embodiments, the average cell size can be 20 nm to 40 nm; and the thermoplastic material can be an amorphous or semi-crystalline polymer. Representative thermoplastic materials in accordance with the first through eleventh embodiments are disclosed herein.

In a twelfth embodiment, a method for making a cellular thermoplastic material is provided. The method includes obtaining a thermoplastic material impregnated with gas; placing the material on a press; applying pressure to the material with the press; heating the press to form cells in the material; and channeling gas away from the material through a gas channeling means to provide a cellular material substantially free of internal blistering and surface deformations.

The method of the twelfth embodiment, wherein the gas channeling means is a breather layer juxtaposed between the surface of the material and the press.

The method of the twelfth embodiment, wherein the gas channeling means is one or more through holes provided in the press.

The method of the twelfth embodiment, wherein the press comprises a first platen and a second platen and the gas channeling means is provided between a surface of the thermoplastic material and a surface of a platen.

The method of the twelfth embodiment, further comprising impregnating gas into the thermoplastic material at a pressure of 1 MPa to 5 MPa.

The method of the twelfth embodiment, further comprising placing more than one thermoplastic materials in the press and heating the more than one thermoplastic material with the press.

The method of the twelfth embodiment, further comprising impregnating more than one thermoplastic material with gas.

The method of the twelfth embodiment, wherein the thermoplastic material is a sheet having an upper surface and a lower surface and pressure is applied on both the upper and lower surfaces of the material with the press.

In a thirteenth embodiment, a method for making a cellular thermoplastic material is provided. The method includes obtaining a thermoplastic material impregnated with gas, wherein the material includes a surface defining a length/width plane and the material has a thickness; placing the material on a press; applying a force to the material with the press normal to the surface, wherein the force produces friction between the surface and the press to generally cause expansion in the thickness dimension and prevent expansion in the length/width plane.

The method of the thirteenth embodiment, wherein more than one thermoplastic material is placed on the press.

The method of the thirteenth embodiment, wherein more than one thermoplastic material is saturated with gas, wherein a porous media is interleaved between thermoplastic materials.

The method of the thirteenth embodiment, wherein the foam thermoplastic material is greater than 3 mm in thickness.

The method of the thirteenth embodiment, wherein the foam thermoplastic material is 6 mm in thickness or greater.

In a fourteenth embodiment, a method for making a composite structure including a thermoplastic foam is provided. The method includes obtaining a thermoplastic material impregnated with a gas and a facesheet; applying an adhesive on at least one surface of the thermoplastic material or the facesheet or both; placing the facesheet on the thermoplastic material; placing the gas-impregnated thermoplastic material with adhered facesheet on a press; and heating the press to cure the adhesive and create a cellular structure in the thermoplastic material impregnated with gas.

The method of the fourteenth embodiment, further comprising applying an adhesive to a second surface of the gas-impregnated thermoplastic material or second facesheet and placing the second facesheet on the second surface.

The method of the fourteenth embodiment, wherein the press is heated to a temperature to cure the adhesive.

The method of the fourteenth embodiment, further comprising selecting one of saturation pressure, saturation time, or desorption time to control the density of the cellular structure in the thermoplastic material for the curing temperature of the adhesive.

In a fifteenth embodiment, a method for making a cellular structure is provided. The method includes placing a first thermoplastic material over a second thermoplastic material, wherein a surface of the first thermoplastic material overlaps a surface of the second thermoplastic material; impregnating the first and second thermoplastic materials with a gas, wherein the gas preferentially impregnates through nonoverlapping surfaces to achieve areas of higher gas concentration closer to the nonoverlapping surfaces suitable for foaming and areas of lower gas concentration not suitable for foaming; placing the overlapping first and the second thermoplastic materials on a press; and heating the first or second thermoplastic materials to cause foaming at the areas of higher gas concentration in the first and second thermoplastic materials and leave the areas of lower gas concentration as solid areas in the first and the second thermoplastic materials.

The method of the fifteenth embodiment, further comprising bonding the first thermoplastic material to the second thermoplastic material so that the foamed area of the first thermoplastic material is next to the foamed area of the second thermoplastic material and the solid areas of the first and the second thermoplastic materials are the exterior layers.

The method of the fifteenth embodiment, further comprising trimming the edges of the first and the second thermoplastic materials.

The method of the fifteenth embodiment, further comprising placing more than one pair of first and second overlapping thermoplastic materials in a pressure vessel and interleaving a porous material between pairs.

The method of the fifteenth embodiment, further comprising placing more than one pair of thermoplastic materials on the press.

In a sixteenth embodiment, a cellular thermoplastic material is provided. The cellular thermoplastic material includes micro-sized cells having an average cell size of greater than 1.0 µm to 100 µm, wherein the micro-sized cells comprise cell walls; and nano-sized features in the cell walls of the micro-sized cells, wherein the nano-sized features have an average size of 0.1 nm to 500 nm n.

The sixteenth embodiment, wherein the thermoplastic material is an amorphous or semi-crystalline polymer.

The sixteenth embodiment, wherein the average is 20 nm to 40 nm.

The sixteenth embodiment, wherein the nano-sized features provide open connectivity between adjacent micro-sized cells.

The sixteenth embodiment, comprising an intrabimodal cellular structure.

In a seventeenth embodiment, a cellular thermoplastic material is provided. The cellular thermoplastic material includes a primary structure comprising nano-sized cells having an average size of less than 1 µm; and secondary micro-sized cells having an average size of 2 µm to 3 µm interspersed among the primary structure.

The seventeenth embodiment, wherein the primary structure comprises the majority of the cellular thermoplastic material.

The seventeenth embodiment, comprising an interbimodal cellular structure.

In an eighteenth embodiment, a cellular thermoplastic material is provided. The cellular thermoplastic material includes a primary structure comprising cells having an average size of 1 µm to 2 µm; and secondary micro-sized cells having an average size of 10 µm to 15 µm interspersed among the primary structure.

The eighteenth embodiment, wherein the primary structure comprises the majority of the cellular thermoplastic material.

The eighteenth embodiment, comprising an interbimodal cellular structure.

In a nineteenth embodiment, a cellular thermoplastic material is provided. The cellular thermoplastic material includes a primary structure comprising nano-sized cells having an average size of 0.1 nm to 100 nm; and secondary micro-sized cells having an average size of greater than 0.1 µm to 100 µm interspersed among the primary structure.

The nineteenth embodiment, wherein the primary structure comprises the majority of the cellular thermoplastic material.

The nineteenth embodiment, comprising an interbimodal cellular structure.

In a twentieth embodiment, a cellular thermoplastic material is provided. The cellular thermoplastic material includes a primary structure comprising cells having an average size of less than 2 μm; and secondary micro-sized cells having an average size of 2 μm to 100 μm interspersed among the primary structure.

The twentieth embodiment, wherein the primary structure comprises the majority of the cellular thermoplastic material.

The twentieth embodiment, comprising an interbimodal cellular structure.

In a twenty-first embodiment, a method for altering the impact strength of a solid thermoplastic material is provided. The method includes obtaining a solid thermoplastic material having an initial impact strength; treating the material under pressure to cause the material to absorb a gas; and treating the material at a lower pressure to allow desorption of gas from the material to produce a solid material having an impact strength altered from the initial impact strength of the solid thermoplastic material.

In a twenty-second embodiment, a method for altering the impact strength of a solid thermoplastic material without substantially changing the density of the solid thermoplastic material is provided. The method includes obtaining a solid thermoplastic material having an initial impact strength and initial density; treating the material under pressure to cause the material to absorb a gas; and treating the material at a lower pressure to allow desorption of gas from the material to produce a solid material having an impact strength altered from the initial impact strength and a density substantially the same as the initial density of the solid thermoplastic material.

In the twenty-first and twenty-second embodiments, the method wherein the thermoplastic material is an amorphous or semi-crystalline polymer.

In the twenty-first and twenty-second embodiments, the method further comprising treating the thermoplastic material at a pressure of 1 MPa to 5 MPa.

In the twenty-first and twenty-second embodiments, the method further comprising treating the thermoplastic material at a lower pressure in ambient atmospheric pressure.

In the twenty-first and twenty-second embodiments, the method wherein the thermoplastic material is polyetherimide.

In the twenty-first and twenty-second embodiments, the method further comprising shaping the thermoplastic material during treating the material at a lower pressure.

In the twenty-first and twenty-second embodiments, the method wherein the thermoplastic material comprises absorbed gas during shaping.

In the twenty-first and twenty-second embodiments, the method further comprising shaping the thermoplastic material after treating the material at a lower pressure.

In the twenty-first and twenty-second embodiments, the method wherein the thermoplastic material is desorbed of gas during shaping.

In the twenty-first and twenty-second embodiments, the method further comprising placing more than one thermoplastic material in a pressure vessel and interleaving a porous material between thermoplastic materials.

In the twenty-first and twenty-second embodiments, the method further comprising assembling the solid thermoplastic material with altered impact strength into an article.

In the twenty-first and twenty-second embodiments, the method wherein the thermoplastic material is a thermoplastic urethane, thermoplastic elastomer, polyethylene naphthalate, polyetherimide, polyetheretherketone, polyphenylene, sulfone, polyamide-imide, polysulfone, polyphenylsulfone, polyethersulfone, polyphthalamide, polyarylamide, polyphenylene sulfide, cyclic olefin copolymer, polyphthalate carbonate, polycarbonate, polyvinylidene chloride, polyurethane, polyphenylene oxide, poly (acrylonitrile-butadiene-styrene), polymethylmethacrylate, crosslinked polyethylene, polystyrene, styrene acrylonitrile, polyvinyl chloride, polybutylene terephthalate, polyethylene terephthalate, polyoxymethylene, polyacetal, polyamide, polyolefin, polyethylene, polypropylene.

In the twenty-first and twenty-second embodiments, the method wherein the impact strength is greater than the initial impact strength.

In the twenty-first and twenty-second embodiments, the method wherein the impact strength is less than the initial impact strength.

In all embodiments above, the thermoplastic material can be a thermoplastic urethane, thermoplastic elastomer, polyethylene naphthalate, polyetherimide, polyetheretherketone, polyphenylene, sulfone, polyamide-imide, polysulfone, polyphenylsulfone, polyethersulfone, polyphthalamide, polyarylamide, polyphenylene sulfide, cyclic olefin copolymer, polyphthalate carbonate, polycarbonate, polyvinylidene chloride, polyurethane, polyphenylene oxide, poly (acrylonitrile-butadiene-styrene), polymethylmethacrylate, crosslinked polyethylene, polystyrene, styrene acrylonitrile, polyvinyl chloride, polybutylene terephthalate, polyethylene terephthalate, polyoxymethylene, polyacetal, polyamide, polyolefin, polyethylene, polypropylene.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Microcellular and nanocellular thermoplastic materials are a group of foams that have a high concentration of small diameter cells. The microcellular range typically refers to cell diameters between greater than 1 μm to 100 μm. Nanocellular polymers are characterized by cell diameters in the sub-micrometer range, typically 0.1 nm to 100 nm. Foams, in general, offer density reductions over unfoamed solid material, thus resulting in a reduction of raw material for the same part or component when a foam material is used in place of the solid material.

In one aspect, embodiments of the present invention relate to methods for reducing the density, i.e., the weight of a thermoplastic material, yet the methods substantially maintain or even improve the desirable mechanical properties of the thermoplastic material in the solid form.

Figure 1:
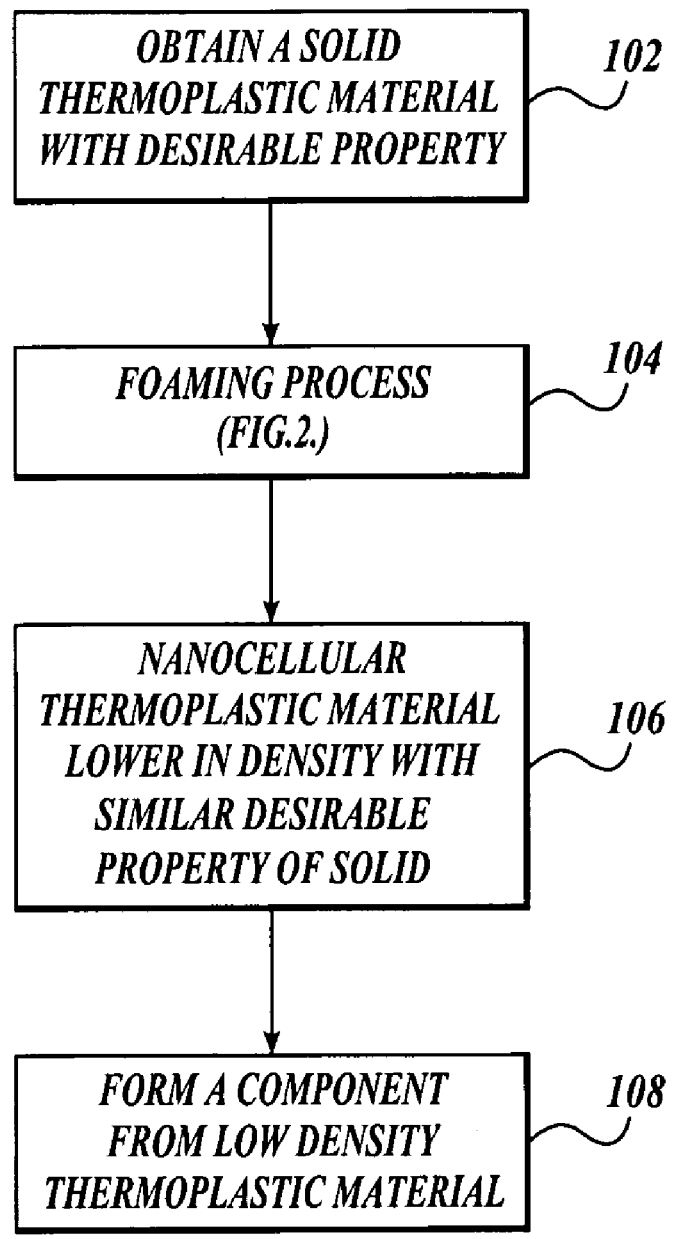
FIG. 1 is a flow diagram of one embodiment of a method in accordance with the present invention.

Referring to FIG. 1, a representative flow diagram of a method for reducing the density of solid thermoplastic materials without substantially lowering selected desirable mechanical properties of the solid thermoplastic materials is illustrated. The method provides the lower density and substantially the same mechanical properties by forming nano-sized cells in the solid thermoplastic material. The average size of the nano-sized cells is 0.1 nm to 100 nm. Another suitable range is 20 nm to 40 nm. The method includes block 100. In block 100, a solid thermoplastic material with a desirable property is obtained. The solid thermoplastic material has an initial density and an initial value of a desirable property. A desirable property can be, but is not limited to, light transmissivity, impact strength, and tensile elongation (strain). A thermoplastic material of lower density is useful in generally all applications where the solid thermoplastic material is useful, but because of the lower density, the weight and the amount of material used is correspondingly reduced without reduction of the desirable property of the solid thermoplastic material.

From block 100, the method enters block 102. In block 102, the solid thermoplastic material is subjected to a foaming process. Various suitable embodiments of a foaming process will be described below in connection with FIG. 3. Foaming processes can be solid-state foaming processes or liquid-state processes.

From block 102, the method enters block 104. In block 104, the method produces a nanocellular thermoplastic material that is lower in density to the initial density of the solid thermoplastic material and has a substantially similar or improved property as the solid thermoplastic material. The foamed thermoplastic material that is produced in block 106 can be used as a substitute for the solid thermoplastic material to make a part or a component that would conventionally be made from the solid thermoplastic material of block 102.

Figure 2:
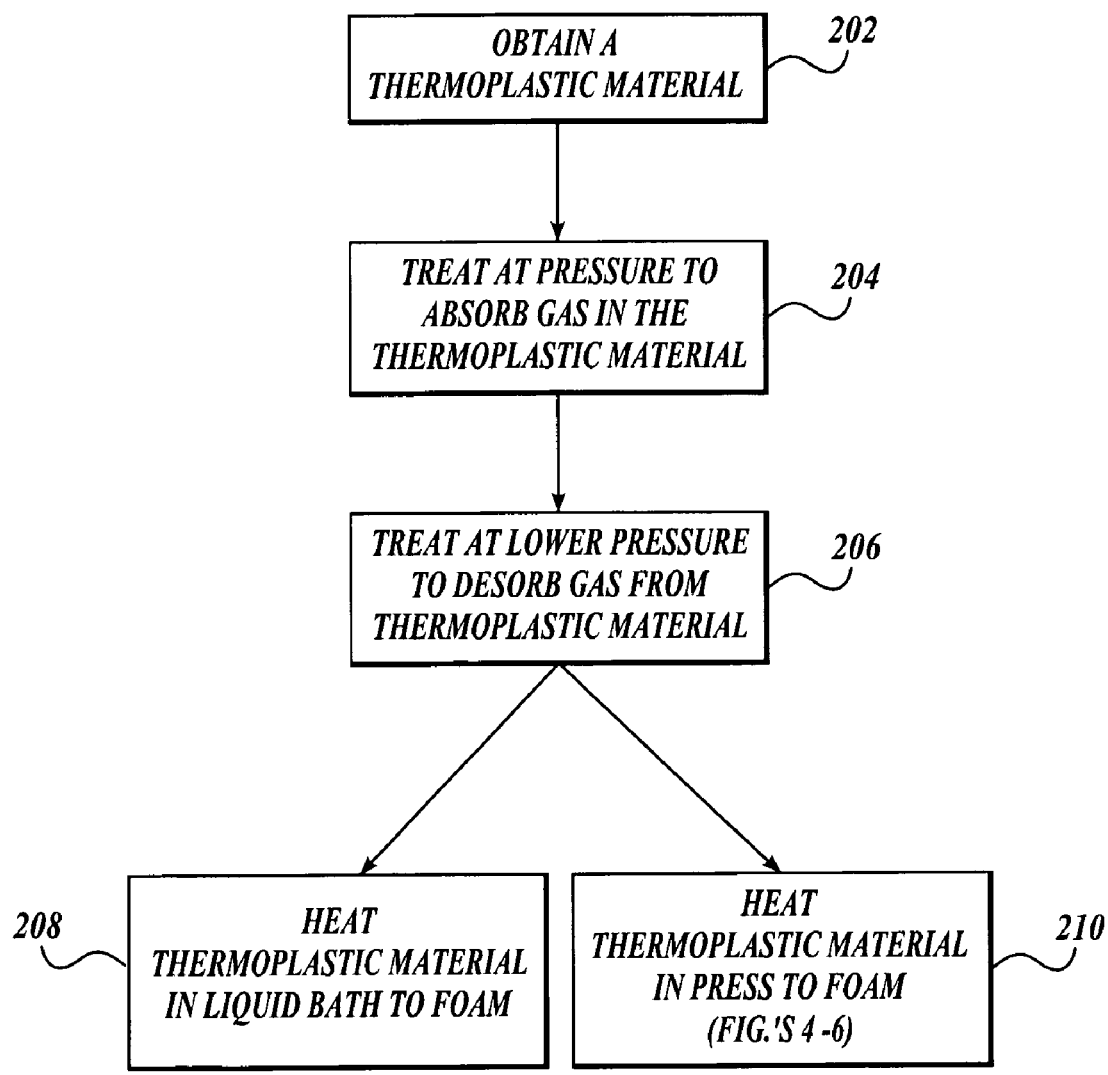
FIG. 2 is a flow diagram of a method in accordance with one embodiment of the present invention.

Referring to FIG. 2, a representative flow diagram of a method suitable to be used as the foaming method in block 104 of FIG. 1 is illustrated. The method of FIG. 2 is a solid-state foaming method. However, liquid-state methods may also be used in place of the solid-state foaming method. Solid-state foaming is a process by which foaming occurs while the polymer remains in the solid state throughout the process. This process differs from other standard polymer foaming processes because the polymer is not required to be in a molten state.

The method includes block 202. In block 202, a thermoplastic material is obtained. The thermoplastic material can be a solid material. Generally, at the beginning of the method, the thermoplastic material is in equilibrium with the surrounding room temperature and atmospheric pressure, and the material is referred to as "unsaturated." Any thermoplastic material that can absorb a gas is suitable to be used in embodiments disclosed herein. From block 202, the method enters block 204. In block 204, the thermoplastic material is treated at an elevated pressure to cause the thermoplastic material to absorb gas. A suitable gas for use in the method is carbon dioxide at pressures in the range of about 1 MPa to about 5 MPa. However, the pressure may vary depending on the solid thermoplastic material and the gas used. The treatment of thermoplastic material in block 204 may be carried out in a pressure vessel, which is sealed, and then the thermoplastic material is exposed to a high pressure inert gas such as, but not limited to, carbon dioxide ($CO_2$) at room temperature within the pressure vessel. The high pressure gas will then start to diffuse into the thermoplastic material over time, filling the material's free intermolecular volume. The gas will continue to saturate the material until equilibrium is reached. As used herein, "saturate" or any derivation thereof means "fully saturated" unless indicated otherwise. Partially saturated means that certain sections have sufficient gas absorbed for nucleation and bubble growth for the foaming temperature. At equilibrium, the sample is said to be "fully saturated." The thermoplastic material can be any shape desirable. However, a sheet is most often used because the time required to provide a constant gas concentration throughout the thickness of the material can be lengthy. More than one sheet can be placed in the pressure vessel to saturate more than one sheet at a time. If the sheets are stacked on top of one another, a porous material is interleaved between sheets to allow the gas to saturate from all sides of the sheet including the side that is next to an adjacent and lower sheet. See, for example U.S. Pat. No. 5,684,055, to Kumar et al., incorporated herein expressly by reference.

Saturation pressures, saturation times, desorption times, and foaming temperature can be varied to effect the type of foam that is produced from the gas-saturated thermoplastic material. At a given foaming temperature, a lower saturation pressure produces a foam of higher density and a higher saturation pressure produces a foam of lower density. Higher foaming temperatures produce foams of lower density. At a given density, a higher saturation pressure produces nano-sized cells and a lower saturation pressure produces micro-sized cells. A representative thermoplastic material discussed throughout this application is polyetherimide. Saturation times to reach equilibrium may vary with the pressure. At a saturation pressure of 1 MPa, polyetherimide produces foams having micro-sized cells, and at a saturation pressure of 5 MPa, polyetherimide produces foams having nano-sized cells. At a saturation pressure of 4 MPa, polyetherimide produces foams having both nano-sized cells and micro-sized cells. For different polymers, the absorption times may vary. The required absorption times to reach the fully saturated condition for thermoplastic materials other than polyetherimide can readily be determined by experimentation. Furthermore, the equilibrium gas concentration in milligrams of carbon dioxide per grams of polyetherimide also varies with saturation pressure. Generally, the thermoplastic material can be determined to be fully saturated when the concentration of gas over time is essentially constant and does not vary. In other words, the slope of a line of a plot of gas concentration on the ordinate and time on the abscissa is essentially zero.

Referring to FIG. 2, from block 204, the method enters block 206. In block 206, the thermoplastic material that is fully saturated with gas is treated at a lower pressure than the saturation pressure to allow the thermoplastic material to undergo desorption of gas. Desorption of some gas is desirable in some circumstances, for example, to avoid the creation of cellular structure in some areas of the thermoplastic material, such as at the surfaces. Desorption of the thermoplastic material can occur when the high pressure gas is vented from the pressure vessel or the saturated material is removed into ambient atmospheric pressure. During block 206, the fully saturated material is removed from the saturation pressure to an environment of lower pressure, so that the material is thermodynamically unstable, meaning that the material is supersaturated with gas and is no longer at equilibrium with the surrounding environment. The material will start to desorb gas from its surface into the surrounding environment. Desorption of gas from the surface will give the foam an integral solid skin because the desorbed skin will not have sufficient gas to foam during the heating step. The thickness of the solid skin at the surface can be increased by allowing for greater desorption times.

Referring to FIG. 2 again, from block 206, the method enters a heating step to create foam. In the illustrated embodiment, the method may enter one of two solid-state foaming processes. However, any other suitable heating process may be used. A first solid-state foaming process is foaming by heating the thermoplastic material in a heated liquid bath, block 208. In a second foaming process, the thermoplastic material can be heated in a press to foam the thermoplastic material, block 210. The latter process has the advantage of creating flat foams. There are a plurality of variations of the heated press foaming method that will be described below in more detail. While the heated liquid bath and heated press method are illustrated, it should be readily appreciated that other methods for heating a solid may be used, such as, but not limited to, a flotation/impingement air oven, or an infrared oven.

In either block 208 or block 210, heating transforms sections of the thermoplastic material from a solid to a cellular structure. Foaming occurs where conditions of gas concentration and temperature are sufficient. When either the gas concentration or temperature are insufficient, foaming does not occur and the thermoplastic material remains a solid, such as at the surfaces from which some amount of gas was allowed to desorb. In block 208, the saturated material is placed into a heating environment, such as a hot liquid bath. The heated liquid bath, block 208, uses a reservoir containing a hot medium, such as oil, heated to a particular temperature. The bath raises the temperature of the material above the glass transition temperature of the polymer-gas system. Above the glass transition temperature, the material will soften and the polymer matrix will begin to crack, providing areas where the saturated gas will begin to fill in; and as heating occurs, the solubility of the gas decreases, and in the areas where the polymer matrix has cracked, nucleation will occur and bubble growth will begin. The main variable that is controlled is the foaming temperature. The foaming temperature will accurately control the final density and cellular structure of the foamed material. After the sample has been allowed to foam for a controlled time, the sample is removed from the heating bath and allowed to cool to room temperature. An alternative to the hot liquid bath is to heat the material in a press.

Block 210 of FIG. 2 may use a press having a first and a second platen. In one embodiment, the first and second platens can be an upper and a lower platen. The surface of the upper and lower platens are flat. This allows for the creation of foams with flat surfaces. However, shaped platens can be used to mold the thermoplastic material into any desirable shape. The platens are preferably heated to the desired temperature with the platens in the closed position. Once the platens are at temperature, the saturated thermoplastic material is placed in the press between the upper and the lower platens. The platens are then forced to close against the upper and lower surfaces of the thermoplastic material so that the lower surface of the upper platen touches the upper surface of the thermoplastic material and the upper surface of the lower platen touches the lower surface of the thermoplastic material. The thermoplastic material can be foamed according to various embodiments of the press foaming technique as illustrated in FIGS. 4 through 6.

After creating a cellular thermoplastic material, it may be desirable to test the mechanical properties to determine whether the cellular thermoplastic material has substantially the same or improved properties as compared to the solid (or unfoamed) version of the thermoplastic material. Generally, for mechanical testing, most if not all the residual gas is allowed to desorb from the cellular thermoplastic material. A suitable method for determining the minimum length of time required for desorption for mechanical testing may be, for example, by plotting gas concentration on the ordinate versus time on the abscissa to determine when the concentration does not substantially lessen over time. Desorption times for other polymers may vary to that of polyetherimide. Furthermore, during the foaming process, gas is released from the thermoplastic material to create the cellular structure. In addition, desorption of gas through a foam is faster than through a solid material. Accordingly, cellular thermoplastic materials will have less residual gas than the solid thermoplastic material if both are allowed to desorb gas for the same period of time. Alternatively, the cellular thermoplastic materials can be desorbed in a vacuum chamber to speed up the desorption process. Depending on size, such as thickness, the desorption times may vary.

Figure 4:
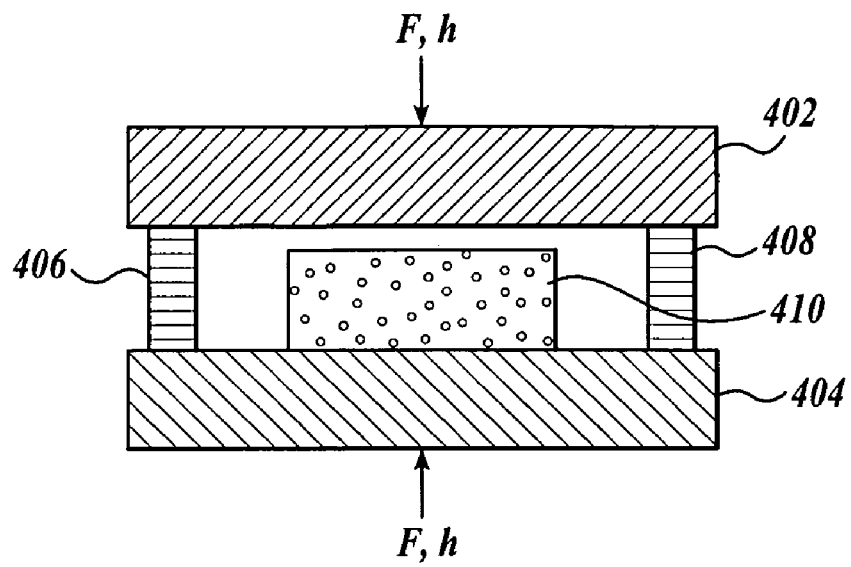
FIG. 4 is a diagrammatical illustration of a heated press shown being used in a prior art foaming method.

Referring to FIG. 4, a conventional heated press foaming technique is illustrated. A first platen 402 and a second platen 404 face the respective upper and lower surface of a thermoplastic material 410. A first metal shim 406 is placed between the lower surface of the upper platen 402 and the upper surface of the lower platen 404. A second metal shim 408 is placed between the lower surface of the upper platen 402 and the upper surface of the lower platen 404. In this way, the upper and lower platens 402 and 404 are prevented from closing beyond the predetermined height or thickness dictated by the dimensions of shims 406 and 408. One or both platens 402 and 404 can be forced in the direction of the arrows designated "F" to press against shims 406 and 408. The force "F" is sufficient to prevent the foam 410 from exceeding the thickness of the shims 406 and 408. One or both platens 402 and 404 can also be heated as indicated by the symbol "h" designating the application of heat to the platens 402 and 404. In this technique, prior to the material 410 foaming, the material begins by only touching one platen, generally the lower platen 404, so that heat to the lower surface of the material 410 is transferred by conduction. Before foaming, the upper surface of the material 410 is not touching the lower surface of the upper platen 402 so that initially heat to the upper surface of the material 410 is transferred mainly by radiation and/or convection from the upper platen 402. As the material 410 foams, the thickness of material 410 increases to the dimensions as determined by the shims 406 and 408, but the material 410 does not force the platens 402, 404 apart. Therefore, the thickness of the foam material 410 can be determined by selecting the appropriate shim dimension. The foaming process is thus constrained to conform to the flat geometry with a preset thickness, hence the term "constrained" foaming. In a variation of this process, the platens can be replaced by surfaces of a mold to create desired shapes other than a flat geometry. An advantage of using a constrained foaming process is that it is easy to create an integral skin of desired thickness by using desorption time as a process variable. As desorption time increases, the thickness of the integral skin without a cellular structure increases. The time required for gas to desorb out of the fully saturated thermoplastic material sheet can range from a few hours to days depending on the desired skin thickness. The method of FIG. 4 achieves flat surfaces by constraining the foam in the thickness direction, which then forces the cellular thermoplastic foam to grow in the length/width plane.

Figure 5:
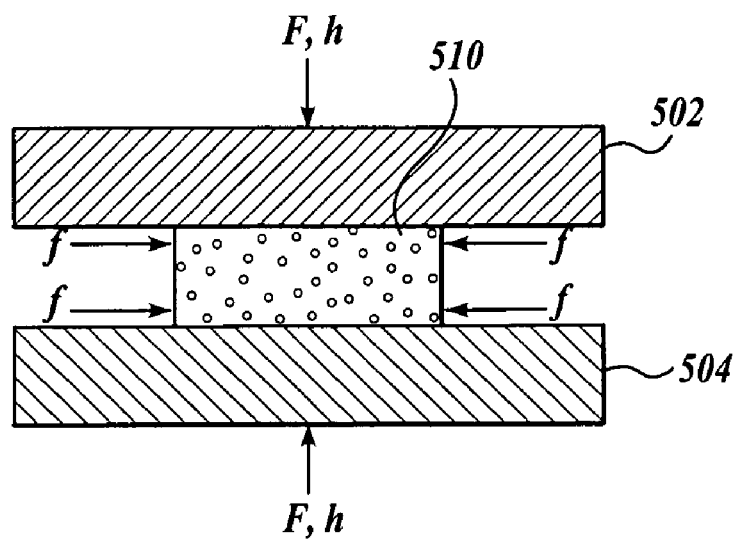
FIG. 5 is a diagrammatical illustration of a heated press shown being used in a foaming method in accordance with one embodiment of the present invention.
Figure 6:
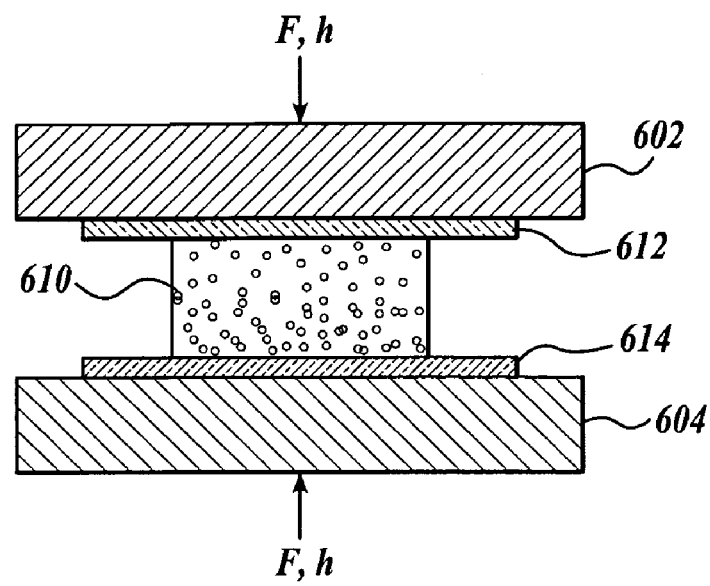
FIG. 6 is a diagrammatical illustration of a heated press shown being used in a foaming method in accordance with one embodiment of the present invention.

In an alternate embodiment illustrated in FIG. 5, the shims 406 and 408 can be omitted. In this alternative technique, the upper platen 502 and the lower platen 504 are allowed to touch the respective upper and lower surfaces of the material 510 before foaming so that heat transferred from the platens 502, 504 to the material 510 is by conduction on both the upper and the lower surfaces. A force is maintained by the platens 502, 504 against the material 510, and as the material 510 foams, the material 510 expands and pushes against the upper platen 502 and the lower platen 504 and forces the upper platen 502 and the lower platen 504 apart.

While the constrained foaming method as illustrated in FIG. 4 is suitable for the creation of foams, the use of the shims 406 and 408 can lead to internal blistering. A method using the heated press as illustrated in FIG. 5 may be used to eliminate some of the internal blistering caused by the use of shims, but the method using the heated press of FIG. 5 may result in large surface deformations.

The internal blistering and the surface deformations may be reduced by the use of a method using the apparatus illustrated in FIG. 6. In FIG. 6, a press is illustrated having an upper platen 602 and a lower platen 604. The upper platen 602 and the lower platen 604 are configured such that a force can be applied in the direction indicated by the arrows having the designation "F" to one or both platens 602 and 604. Similarly, heat designated by the letter "h" may be applied to one or both platens 602 and 604. In the embodiment illustrated in FIG. 6, the shims 406 and 408 of FIG. 4 are not used. A breather layer 612 is interposed between the upper surface of the thermoplastic material 610 and the lower surface of the upper platen 602. A second breather layer 614 is interposed between the lower surface of the material 610 and the upper surface of the lower platen 604. The purpose of breather layers 612 and 614 is to allow desorbed gas to escape from the thermoplastic material 610 as the material is foaming. In particular, as the thermoplastic material begins to off gas, the gas is allowed to escape through the breather layers 612 and 614.

Figure 7:
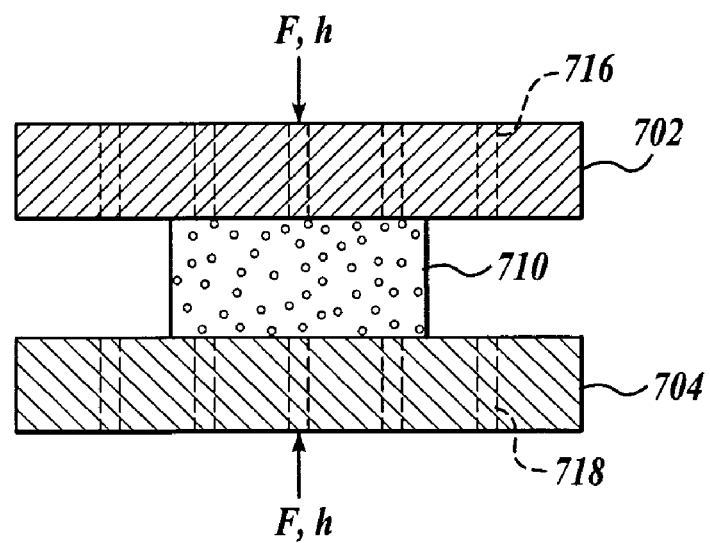
FIG. 7 is a diagrammatical illustration of a heated press shown being used in a foaming method in accordance with one embodiment of the present invention.

An alternative of the embodiment illustrated in FIG. 6 is the embodiment illustrated in FIG. 7.

FIG. 7 illustrates an upper platen 702, a lower platen 704, wherein both upper and lower platens 702 and 704 are configured such that a force "F" can be applied to close one or both of the platens against a thermoplastic material 710 as it is being foamed. However, unlike the embodiment of FIG. 6 that uses a first and second breather layer 712 and 714, the embodiment of FIG. 7 eliminates the need for breather layers, and instead includes through bores 716 in the upper platen 702 and through bores 718 in the lower platen 704. The through bores 716 and 718 are functionally equivalent to the breather layers 612 and 614 of FIG. 6 in that the through bores 716 and 718 allow for the escape of gas from the thermoplastic material 710 such that internal blistering and surface indentations are reduced.

In one embodiment of a method, the device illustrated in FIG. 5, can be used to control the thickness of the cellular thermoplastic material 510.

The force "F" applied by one or both platens 502 and 504 is normal to the thermoplastic material's surfaces and, thus, creates frictional forces "f" at the interface between the heated platens 502, 504 and the thermoplastic material 510 that resists the expansion of the thermoplastic material 510 against the frictional forces "f." In the illustration, the thermoplastic material 510 has a thickness dimension and a length/width, or the "in-plane" dimension. The frictional force at this interface can be defined as $$f = \mu F \quad (1)$$

where, f is the frictional force
  $\mu$ is the co-efficient of friction between heated platens and foaming thermoplastic sheet
  F is the normal force applied on the foaming plastic sheet by the heated platen For a given $\mu$, as the normal force "F" increases, the frictional force also increases. This increasing frictional force restricts the in-plane expansion of the foaming thermoplastic sheet 510 in the length/width dimension. Due to this restriction on the in-plane growth, most of the foam growth then occurs in the thickness dimension. The foaming sheet 510 pushes against the platens 502, 504 overcoming the normal force and continues to grow in thickness. For a given set of processing conditions including saturation pressure, desorption time, and foaming temperature, the final thickness of the cellular thermoplastic sheet 510 can be varied by varying the normal force applied during foaming. Therefore, one method includes the step of controlling the normal force sufficient to increase the frictional forces to prevent growth in the length/width dimension, but the normal force is insufficient to prevent increases in the thickness of the microcellular plastic sheet 510. There is an upper limit of the normal force beyond which the foaming cellular thermoplastic sheet can no longer support the compressive normal force. This may lead to either of the two conditions: (1) the driving force behind foaming will overcome the frictional force causing in-plane expansion of the thermoplastic sheet, or (2) the foam structure collapses due to cell wall failure.

Figure 8:
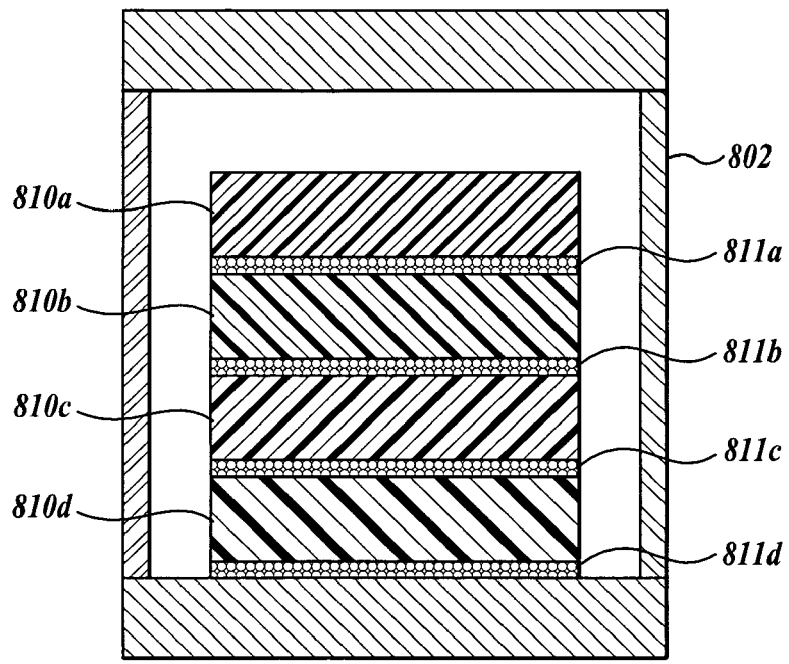
FIG. 8 is a diagrammatical illustration of a pressure vessel being used to gas saturate thermoplastic materials interleaved with porous materials to be used in a foaming method in accordance with one embodiment of the present invention.
Figure 9:
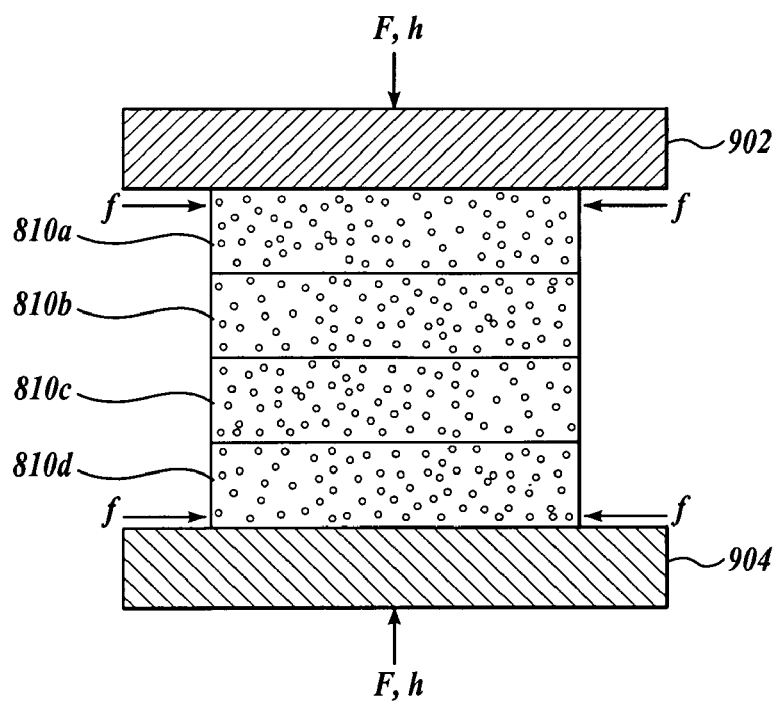
FIG. 9 is a diagrammatical illustration of a heated press shown being used in a foaming method in accordance with one embodiment of the present invention.

FIGS. 8 and 9 show another embodiment illustrating a method in which a stack of gas-saturated thermoplastic sheets 810a, b, c, and d can all be foamed at once between the heated platens 902 and 904. Foaming in this stacked manner can create thick composite cellular sheets with desirable density and thickness. It is possible to create multi-layered composite cellular structures by foaming and bonding more than one gas-saturated thermoplastic sheet in one step according to the following method.

The method includes saturating more than one thermoplastic sheet at high pressure with gas in a pressure vessel 802 as illustrated in FIG. 8. In FIG. 8, thermoplastic sheets 810a, b, c, and d are interleaved with a porous media 811a, b, c, and d, such as paper towels, to provide a means for allowing the gas to saturate the surfaces of sheets adjacent to one another between the thermoplastic sheets. The one or more of the thermoplastic sheets 810a, b, c, and d are placed in the pressure vessel 802 and a high pressure gas, such as carbon dioxide, is introduced to the vessel 802. After achieving full saturation, the one or more sheets are removed from the pressure vessel 802, and are allowed to desorb for the desired desorption time. After the predetermined desorption time has elapsed, the gas-saturated thermoplastic sheets 810a, b, c, and d are transferred to the press between the heated platens 902 and 904 as illustrated in FIG. 9. This can be done either one thermoplastic sheet at a time or more than one thermoplastic sheets without the porous interleaved media. An adhesive may be used between the sheets to bond the sheets into a composite cellular structure. The heated platens 902 and 904 may be at the desired foaming temperature. The hydraulic press is operated to apply a normal force to the platens. The normal force is chosen depending on the desired final foam thickness.

Another embodiment for the use of the device of FIG. 5 is a method for creating a multi-layered cellular structure that has one or more facesheets made from the same or different material and a core foam material. Currently, composite sandwich panels are constructed in two or more steps. The composite facesheets and foam (or honeycomb) core are manufactured separately. Then, the composite facesheets are bonded to the two surfaces of the foam (or honeycomb) core with adhesive resins. This assembly is then cured at elevated temperatures to achieve a lightweight composite sandwich structure with excellent stiffness and strength characteristics. In addition to the multiple manufacturing steps, and due to the porous surface of the foam (or honeycomb) core used currently, the amount of adhesive resin used to bond the facesheets uniformly to the surface of the foam core is wasteful. Adhesive resin is used to fill up the pores on the foam (or honeycomb) core surfaces so as to create a flat continuous layer of adhesive resin to which the facesheets are attached. This extra adhesive resin also increases the overall weight of the sandwich panel.

Figure 10:
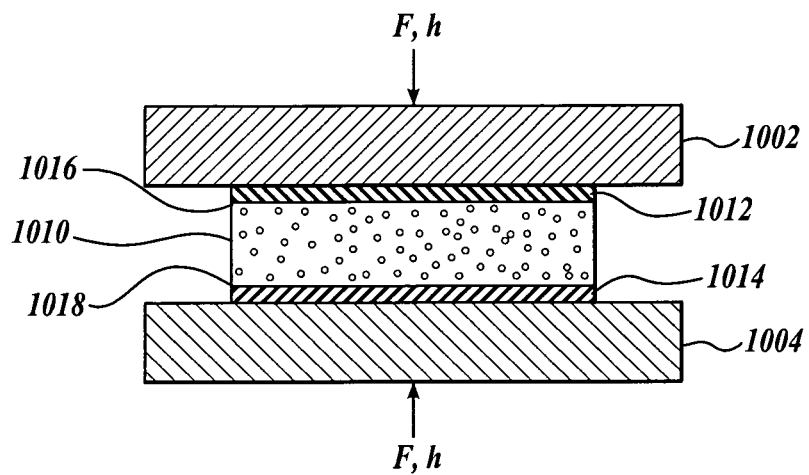
FIG. 10 is a diagrammatical illustration of a heated press shown being used in a foaming method in accordance with one embodiment of the present invention.

One embodiment is a method for making a composite structure with a foam core and at least one facesheet as illustrated in FIG. 10. Conventionally, structures having a foam core and facesheets were assembled after independently forming the foam core and the facesheet separately. The facesheet would then be normally adhered with an adhesive to the foam core. However, because of the foam or honeycomb core that is used, adhesive is wasted on covering the entire cellular surface of a foam or honeycomb structure. The disclosed method can be used to provide lighter composite sandwich panels due to a reduction in the amount of adhesive resin. The adhesive used is less because the adhesive is added to the core and/or facesheet before the core is converted into a foam, not after, as in the conventional method. The method involves using a cellular thermoplastic material 1010 as a core in place of the conventional foam or honeycomb core used currently. The density of the cellular thermoplastic material 1010 can be created with a density that is substantially the same as that of the foam cores used currently. As previously described, a stack of thermoplastic sheets can be saturated with carbon dioxide gas in a high-pressure environment by interleaving a porous material between sheets to allow gas to penetrate from all surfaces of the sheets. After saturation of the thermoplastic sheets, they are removed from the pressure vessel and allowed to desorb gas for a few minutes so as to enable forming a thin integral solid skin when the sheet is foamed in the heating step. After the predetermined desorption time has elapsed, one or more facesheets 1012 and 1014 are bonded to the upper and lower surfaces of each gas-saturated thermoplastic sheet 1010 using a thin layer of adhesive resin 1016 and 1018. The assembly is then placed between the heated platens 1002 and 1004 of a hydraulic press and the press is controlled sufficient to keep the composite substantially flat. The platens 1002 and 1004 are heated to the curing temperature of the adhesive resin. The curing temperature is therefore the foaming temperature of the gas-saturated thermoplastic sheets. The assembly is held at this temperature to allow the adhesive to cure and the gas-saturated sheet to foam in one step. The smooth integral skin that is formed because of desorption allows using reduced amounts of adhesive resin between the facesheets 1012 and 1014 and the cellular foam core 1010. Since the foaming temperature is also the curing temperature of the adhesive resin and cannot be varied, the density of the cellular foam core 1010 can be controlled by varying the other processing variables, such as saturation pressure, saturation time, desorption time, etc.

Another embodiment is a method of forming multi-layered panels. The panels have a foam core at the center and a solid thick skin surface. Conventionally, to make such a panel, a single, monolithic thermoplastic material was used. Because a foam core was desired, the thermoplastic material was fully saturated to achieve a uniform gas concentration throughout the material, including the center. The thermoplastic material was then allowed to desorb gas from the upper and lower surfaces for a predetermined length of time that would result in the solid skin surface of desired thickness. However, the time periods for full saturation to reach equilibrium and desorption required long periods of time. The disclosed method uses a first and second thinner sheet of thermoplastic material to lessen the amount of time required for absorption.

Figure 11:
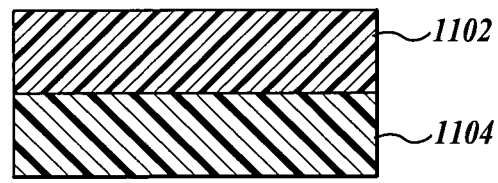
FIG. 11 is a diagrammatical illustration of thermoplastic materials to be used in a foaming method in accordance with one embodiment of the present invention.
Figure 12:
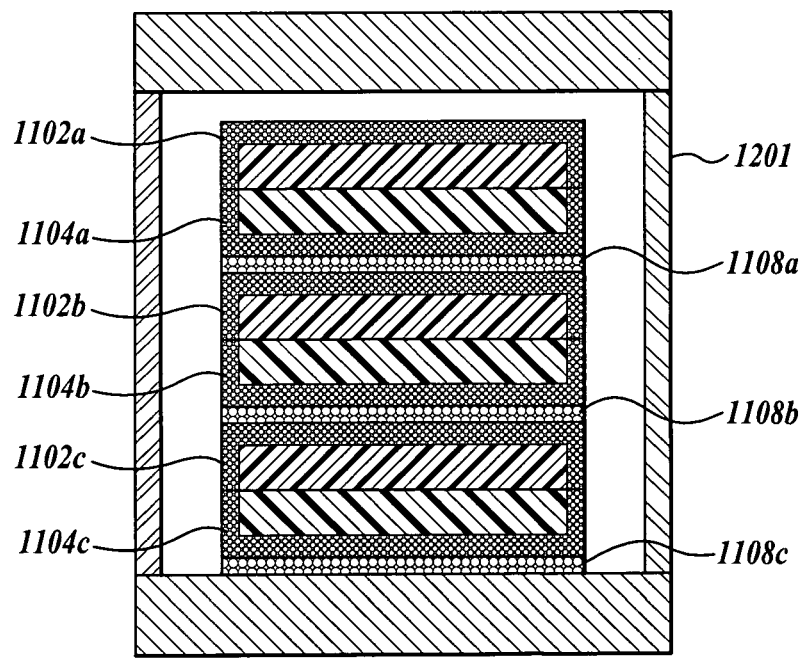
FIG. 12 is diagrammatical illustration of a pressure vessel being used to partially gas saturate pairs of thermoplastic materials to be used in a foaming method in accordance with one embodiment of the present invention.
Figure 13:
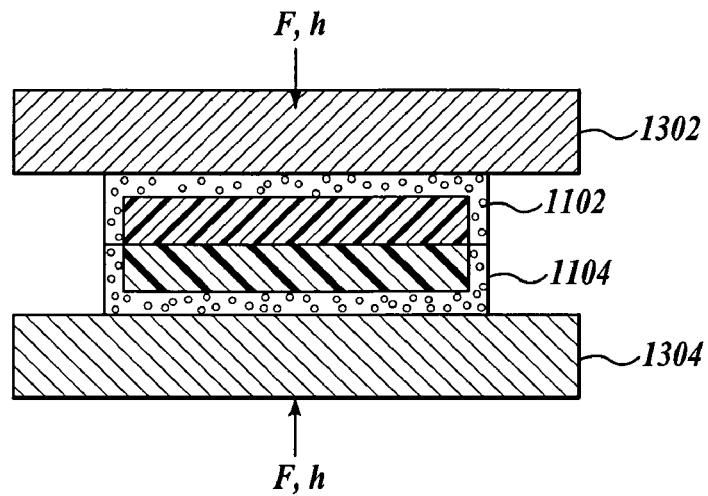
FIG. 13 is a diagrammatical illustration of a heated press being used in a foaming method in accordance with one embodiment of the present invention.
Figure 14:
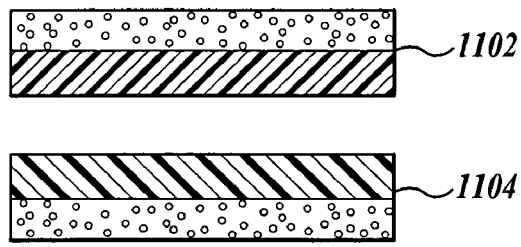
FIG. 14 is diagrammatical illustration of partially foamed thermoplastic materials to be used in a method in accordance with one embodiment of the present invention.
Figure 15:
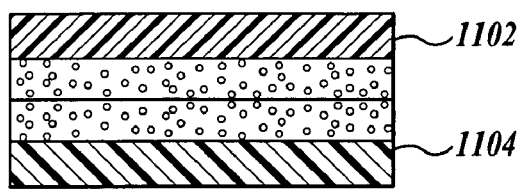
FIG. 15 is diagrammatical illustration of partially foamed thermoplastic materials adhered to each other to produce a composite material in accordance with one embodiment of the present invention.

Referring to FIG. 11, in one embodiment of making a multi-layered panel, first 1102 and second 1104 thermoplastic sheets are stacked together with one of their major surfaces overlapping and in contact with one another. During saturation, only one of the two major surfaces of each of the thermoplastic sheets 1102 and 1104 is exposed to a high-pressure carbon dioxide gas environment as shown in FIG. 12. The porous interleaved materials described earlier are not used between pairs of sheets, thus, preventing absorption of gas via the overlapping surfaces because the overlapping surfaces are not fully exposed to the gas. Since the overlapping surfaces are kept in contact, the gas diffuses into the thermoplastic sheets 1102 and 1104 mainly through the nonoverlapping surfaces exposed to the high-pressure environment. In the case of multiple pairs as illustrated in FIG. 12, porous interleaved materials 1108a, 1108b, and 1108c are used and placed between the pairs of sheets to allow gas to absorb on the surfaces between pairs. The time in the pressure vessel 1201 is chosen as needed to attain minimum gas concentration required for foaming in approximately half of the starting sheet thickness (denoted by lattice in the illustration). It is noteworthy that in FIG. 12, the overlapping surfaces in each pair of sheets has not reached the minimum gas concentration necessary for foaming. In FIG. 12 all around the border areas, with the exception of overlapping surfaces, a lattice representing the regions of the solid thermoplastic sheets having the minimum gas concentration available for foaming at the predetermined foaming temperature is shown. The center areas are regions which do not have the minimum gas concentration required for foaming. Hence, during the foaming step, the border areas of the thermoplastic sheets will have bubble nucleation and growth while the center areas of the sheets will remain solid. Once the gas concentration profile is achieved, the pairs of stacked sheets are removed from the pressure vessel 1201 and are transferred (optionally in stacked pairs) to the hydraulic press as shown in FIG. 13. The platens 1302 and 1304 of the press are set at a temperature that causes foaming in the border areas with minimum gas concentration to cause bubble nucleation and growth in those areas, while the center areas with lower than the minimum gas concentration remain solid. The stacked pair of sheets 1102 and 1104 is put in the heated press such that the surfaces with the minimum gas concentration required for foaming are in contact with the platens 1302 and 1304. After the foam growth is completed in both the sheets 1102 and 1104, the stacked pair of partially foamed sheets 1102 and 1104 is removed from the press. The edges at the ends of both of the sheets 1102 and 1104 may be trimmed as shown in FIG. 14 leaving a foamed material having one side with cellular structure and one side of solid material. The trimmed sheets 1102 and 1104 are then bonded via an adhesive or mechanical fastener to each other in a manner such that the layer of foam of each sheet 1102 and 1104 faces each other and are at the center of the multi-layered panel, and the solid layers are the exterior surfaces of the multi-layered panel as shown in FIG. 15. In the disclosed method, during the saturation step, gas is allowed to partially saturate the thermoplastic sheets to create the desired skin thickness instead of allowing for full saturation, followed by long desorption time. Thus, this method decreases the time required for producing a multi-layered panel having a foam core with solid thick skin.

The methods disclosed in association with FIGS. 5-15 can be used to create thick cellular sheets. In some embodiments, the sheets can be greater than 3 mm and in other embodiments, the sheets can be at least 6 mm thick. A heated press provides easier control and faster production rates in the manufacturing of cellular thermoplastic sheets that have potential applications in the construction industry, automobile and boat manufacturing, and other load-bearing applications.

Figure 16:
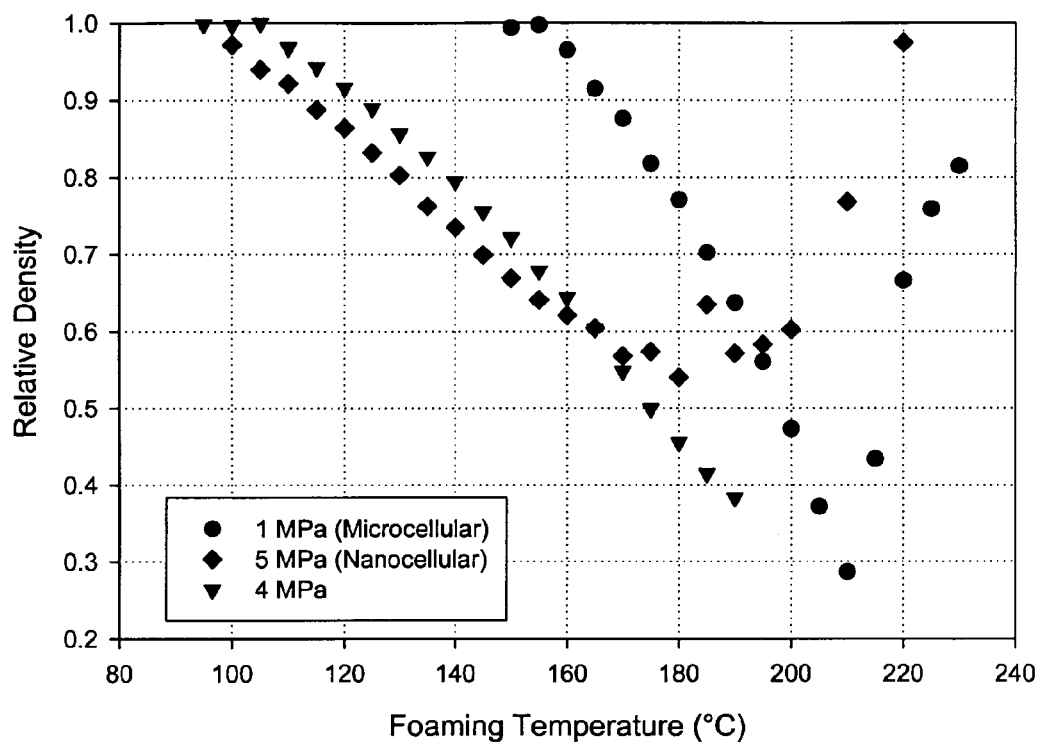
FIG. 16 is a graph plotting the relative density of microcellular and nanocellular foams as a function of foaming temperature.

As disclosed herein, controlling the temperature during the foaming process allows for controlling the density of the foamed thermoplastic material. An advantage of reducing the density is the reduction in weight and material. Thus, parts and components can be built with less material and weigh less than their solid counterparts. Referring to FIG. 16, a graph illustrating the relative density of a polyetherimide foam as a function of temperature for three saturation pressures is illustrated. FIG. 16 illustrates that above a certain temperature, the relative density becomes unpredictable. For a saturation pressure of 1 MPa, the maximum temperature appears to be approximately 210° C. The lowest relative density at a saturation pressure of 1 MPa is slightly below 0.3. For a saturation pressure of 5 MPa, the highest temperature appears to be approximately 180° C. The lowest relative density for a saturation pressure of 5 MPa is approximately 0.55. Relative density varies from about 0.3 to less than 1.0. While FIG. 16 is a graph for polyetherimide, it is generally believed that other materials will follow similar trends.

Further, as disclosed above in connection with FIG. 1, creating nano-sized cells in a thermoplastic material that have an average size of from 0.1 nm to 100 nm, or in the range of 20 nm to 40 nm produces foams that are lower in density to the initial density of the material, but retain some of the desirable properties of the solid thermoplastic material. Among the desirable properties are light transmissivity, impact strength, and tensile elongation. The procedures for determining density, light transmissivity, impact strength, and tensile elongation (strain) are described in the EXAMPLES section below.

Accordingly, respective methods for decreasing the density of a thermoplastic material without substantially reducing the light transmissivity, impact strength, and tensile elongation of the material are disclosed that introduce nano-sized cells having an average size of 0.1 nm to 100 nm into the thermoplastic material. While tensile elongation is the property that is tested in the EXAMPLES section below, it is to be appreciated that tensile elongation is representative of a material's ability to bend without breaking. Therefore, the methods disclosed herein not only result in sustained tensile elongation of materials, but also when the material is both under compression and tension, such as when a material is being bent. In this case, the material undergoes a compressive force on one side and tension on the opposite side. The disclosed method, therefore, produces a material that also has a higher bending ability without break than the solid material. Therefore, as used herein, "elongation" is not limited to elongation occurring solely under tensile strain, and may include elongation when under tension and compression, such as when bending.

Furthermore, in addition to providing significant light transmissivity, nano-sized cells also have the ability to transmit or deflect different wavelengths of light. For example, in the size of 20 nm to 40 nm, the nano-sized cells can scatter blue light and allow red light to pass through, which has the effect of coloring the material a blue color. Accordingly, by adjusting the cell size in the nano-size range of 0.1 nm to 100 nm, color can be added to the material without introducing pigments in the material.

Because of the ability of nano-sized cells to block or deflect certain wavelengths of light, a light filter can be constructed from a thermoplastic material by forming nano-sized cells of an average cell size of 0.1 nm to 100 nm, wherein the size of the cells determines the wavelength of light that is filtered by the thermoplastic material. The thermoplastic light filter with nano-sized cells can be used in a method to block light of a certain wavelength.

Figure 3:
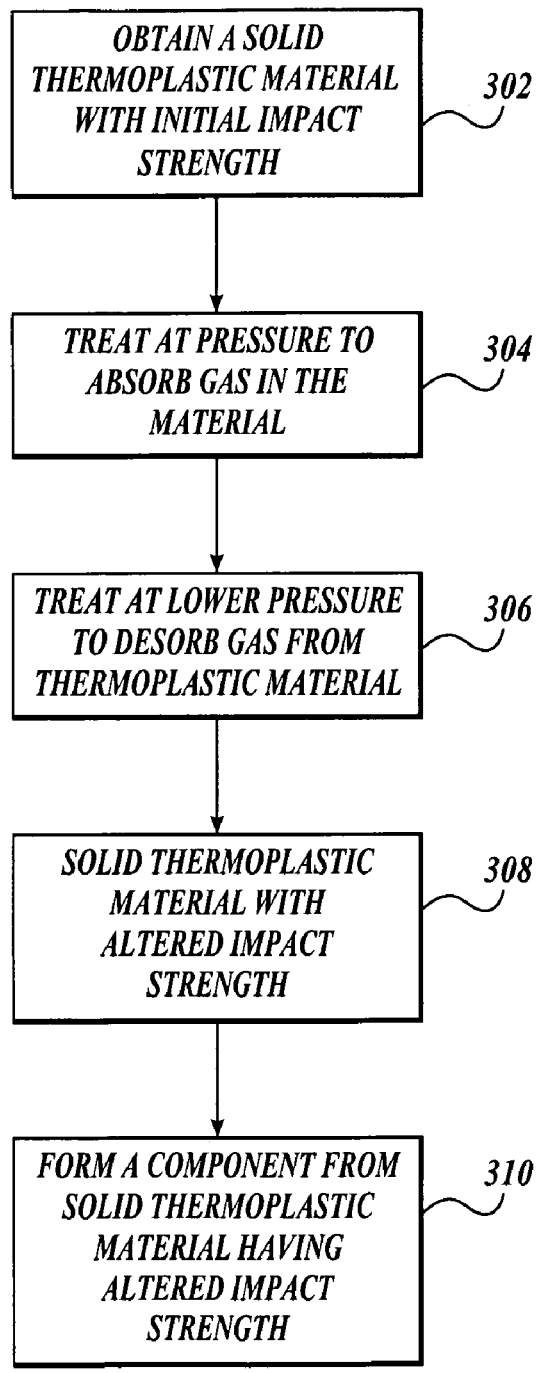
FIG. 3 is a flow diagram of a method in accordance with one embodiment of the present invention.
Figure 31:
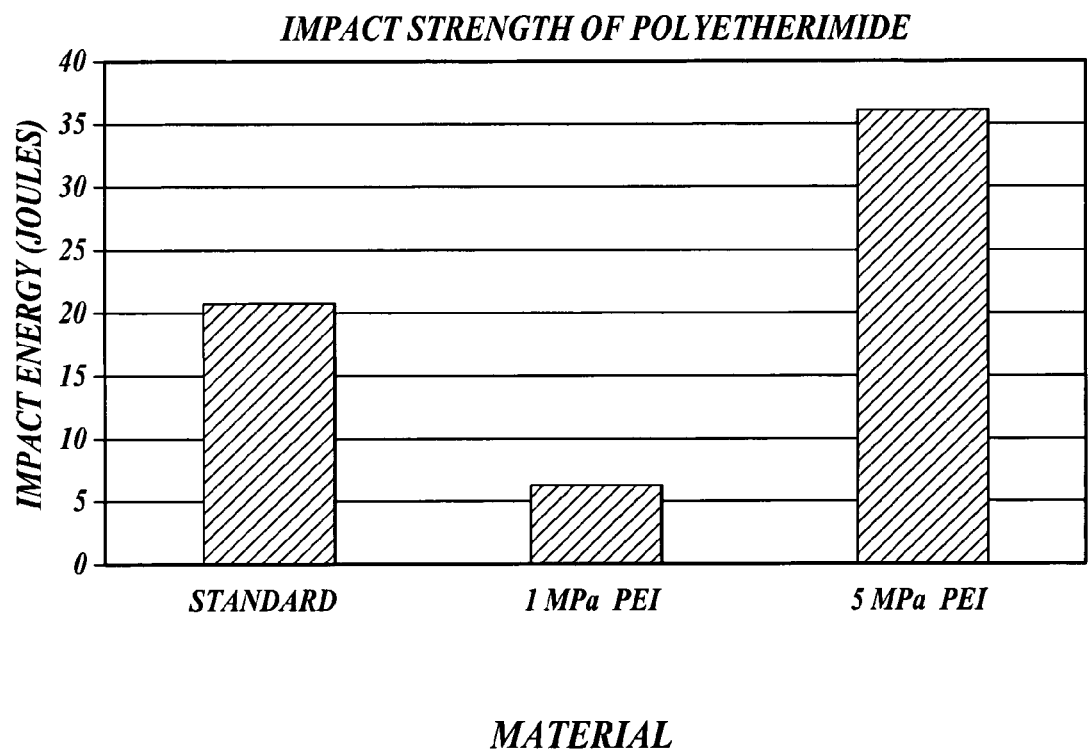
FIG. 31 is a bar graph of the impact energy of solid polyetherimide that has been saturated and desorbed of gas at a high and low pressure.
Figure 32:
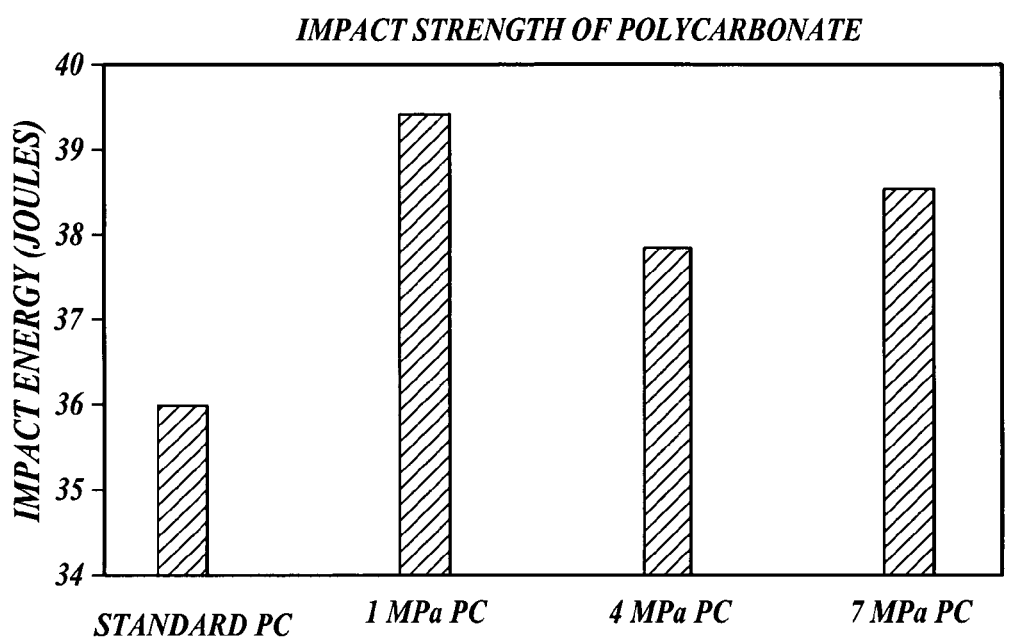
FIG. 32 is a bar graph of the impact energy of solid polycarbonate that has been saturated and desorbed of gas at a high and low pressure.
Figure 33:
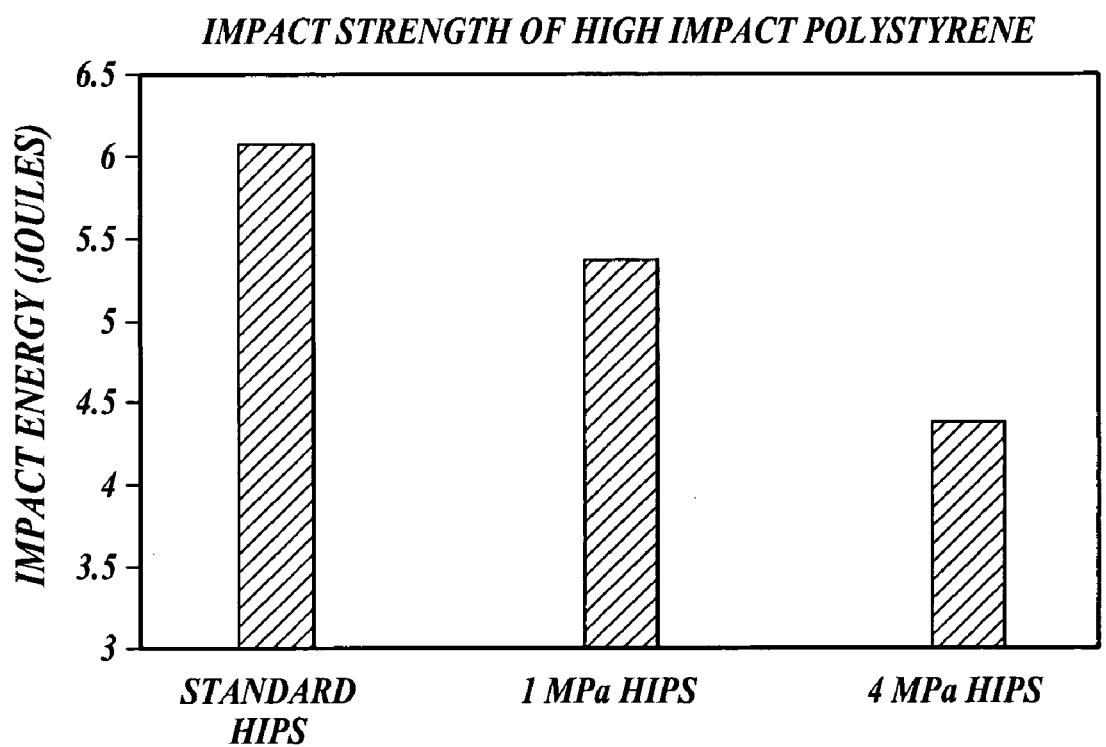
FIG. 33 is a bar graph of the impact energy of solid high impact polystyrene that has been saturated and desorbed of gas at various pressures.

Referring to FIG. 3, another embodiment of a method for altering the impact strength of a solid thermoplastic material is illustrated. The method includes block 302. In block 302, a solid thermoplastic material is obtained. The solid thermoplastic material has an initial impact strength. From block 302, the method enters block 304. In block 304, the thermoplastic material is treated at an elevated pressure to cause gas to be absorbed in a thermoplastic material. From block 304, the method enters block 306. In block 306, the thermoplastic material is treated at a lower pressure to allow gas to desorb from the thermoplastic material. From block 306, the method enters block 308. In block 308, a solid thermoplastic material having an altered impact strength different than the initial impact strength is produced by the treatment in blocks 304 and 306. When the thermoplastic material is treated at a low pressure on the order of 1 MPa, the impact strength is decreased compared to the initial impact strength, and when the thermoplastic material is treated at a high pressure on the order of 5 MPa, the impact strength is increased compared to the initial impact strength. Whether the impact strength is increased or decreased may vary with the saturation pressure. Optionally, the method further includes block 310. In block 310, the solid thermoplastic material having an altered impact strength different than the initial impact strength can be used to form a component or a part that can replace the normal thermoplastic material with initial impact strength. In one embodiment, block 310 is performed on the thermoplastic material that is desorbed according to block 306. For example, forming a component may involve shaping the desorbed thermoplastic material in a cold pressing technique, or by applying a mild heat treatment. In another embodiment, forming a component or part may be performed simultaneously with block 306, and while the thermoplastic material is undergoing desorption of gas. For example, the thermoplastic material may be shaped by a cold pressing technique during block 306, or by applying a mild heat treatment. The material that is treated by the methods disclosed herein in connection with FIG. 3 may be any shape and/or size. For example, a component of an aircraft or any land vehicle may be treated after being formed. As disclosed above, the saturation pressure may determine whether the treatment results in increased or decreased impact strength. Referring to FIG. 31, the impact strength of solid polyetherimide saturated at 1 MPa and desorbed has an impact strength lower than the impact strength of the standard material. The impact strength of solid polyetherimide saturated at 5 MPa and desorbed has an impact strength greater than the impact strength of the standard material. Referring to FIG. 32, the impact strength of solid polycarbonate saturated at 1 MPa and desorbed has an impact strength greater than the impact strength of the standard material. The impact strength of solid polycarbonate saturated at 4 MPa and desorbed has an impact strength greater than the impact strength of the standard material, but less than the solid polycarbonate saturated at 1 MPa. The impact strength of solid polycarbonate saturated at 7 MPa and desorbed has an impact strength greater than the impact strength of the standard material and the solid polycarbonate saturated at 4 MPa, but less than the solid polycarbonate saturated at 1 MPa. Polycarbonate (PC) is a widely used plastic especially for impact applications, such as sunglass lenses, nalgene water bottles, and bulletproof glass windows. PC shows an increase in impact resistance over a wide range of saturation pressures from 1, 4, and 7 MPa. In FIG. 33, the impact strength of solid high-impact polystyrene saturated at 1 MPa and desorbed has an impact strength lower than the impact strength of the standard material. The impact strength of solid high impact polystyrene saturated at 4 MPa and desorbed has an impact strength lower than the impact strength of the standard material and of the polystyrene saturated at 1 MPa. High Impact Polystyrene (HIPS) exhibits a decreasing impact strength with the saturation pressures. Accordingly, whether the impact strength of a material increases or decreases depends on the saturation pressures.

As disclosed above, at saturation pressures of 5 MPa, nano-sized cells were formed in polyetherimide. A nano-sized cell as defined herein has a size from 0.1 nm to 100 nm. A nano-cellular foam has cells that have an average cell size from 0.1 nm to 100 nm. In another embodiment, a nano-sized cell can have a size from 20 nm to 40 nm. At saturation pressures of 1 MPa, micro-sized cells were formed in polyetherimide. A micro-sized cell as defined herein has a size from greater than 0.1 micrometers ($\mu m$) to 100 micrometers ($\mu m$). A microcellular foam has cells that have an average cell size from 0.1 $\mu m$ to 100 $\mu m$. At saturation pressures of 4 MPa, both nano-sized cells and micro-sized cells were formed in polyetherimide. These cellular structures are described below.

Figure 17:
FIG. 17 is a scanning electron micrograph of a foam containing nano-sized cells made in accordance with one embodiment of the present invention.

Referring to FIG. 17, a scanning electron micrograph of a cross-sectional view of foamed polyetherimide shows nano-sized cells having cell diameters in the submicrometer range. Foams having nano-sized cells can be created using the hot liquid bath or heated press method disclosed herein or other heating method. Foams having nano-sized cells with an average cell size of from 0.1 nm to 100 nm are believed to have desirable mechanical properties, such as light transmissivity, impact strength, and tensile elongation that are substantially the same or higher than that of the starting solid thermoplastic material, and are also believed to be higher than the same properties for a microcellular structure. In the particular instance of polyetherimide, based on the molecular size calculations for polyetherimide of 100 nm, the cellular size produced in the nanocellular material creates bubbles much smaller than the estimated molecular size. The circumference of half a bubble would be in the range of 31.4-62.8 nm for a cell size range of 20-40 nm. This would allow for polyetherimide molecules to stretch from one side of the cell to the other and still have 38-69 nm of molecular length to entangle with molecules on either side of the cell. The scale of the cellular size might have drastic effects on the mechanical properties of these nanocellular forms. In contrast, microcellular voids of 3 μm would create a half circumference of 4.7 μm. At this cellular size, it would take forty-seven 100 nm-sized polyetherimide molecules to reach from one side of the cell to the other.

Figure 18:
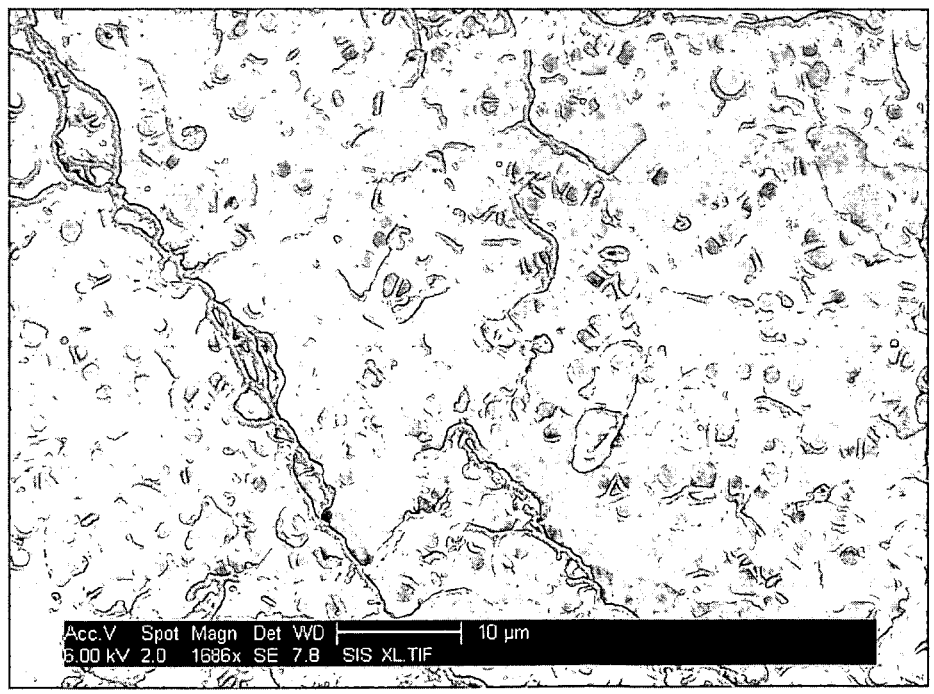
FIG. 18 is a scanning electron micrograph of a foam containing micro-sized cells made in accordance with one embodiment of the present invention.

FIG. 18 is a scanning electron micrograph of a cross-sectional view of microcellular polyetherimide with cell diameters in the 3 micrometer range. Foams having micro-sized cells can be created using the hot liquid bath or heated press method disclosed herein or other heating method. Micro-sized cells are considered to have an average cell size ranging from greater than 1 μm to 100 μm.

Both the microcellular thermoplastic foams and the nanocellular thermoplastic foams can be created using a solid-state foaming method, such as the heated liquid bath method or any variation of the heated press method disclosed herein, wherein the saturation pressure is 1 MPa to create microcellular structures, and the saturation pressure is 5 MPa to create nanocellular structures. When the structure includes nano-sized features and micro-sized features, the structure is bimodal. Several bimodal cellular structures are possible using the disclosed foaming methods. To create bimodal foams as disclosed herein, the gas being desorbed during the heating process may be allowed to escape from the material.

Figure 19:
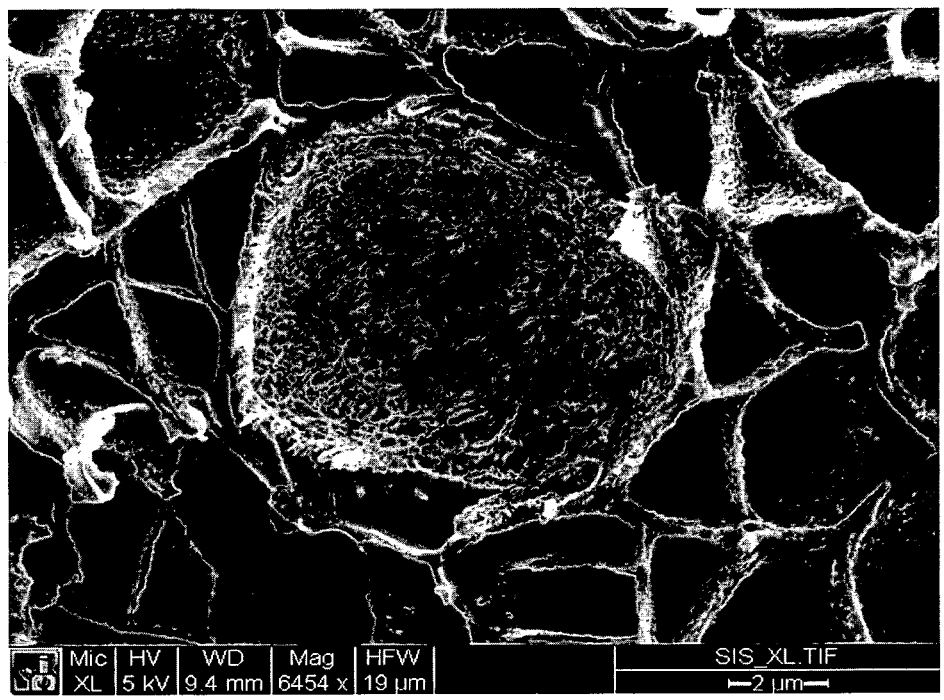
FIG. 19 is a scanning electron micrograph of a foam containing micro-sized cells with nano-sized features on the cell walls in an intrabimodal cellular structure in accordance with one embodiment of the present invention.
Figure 20:
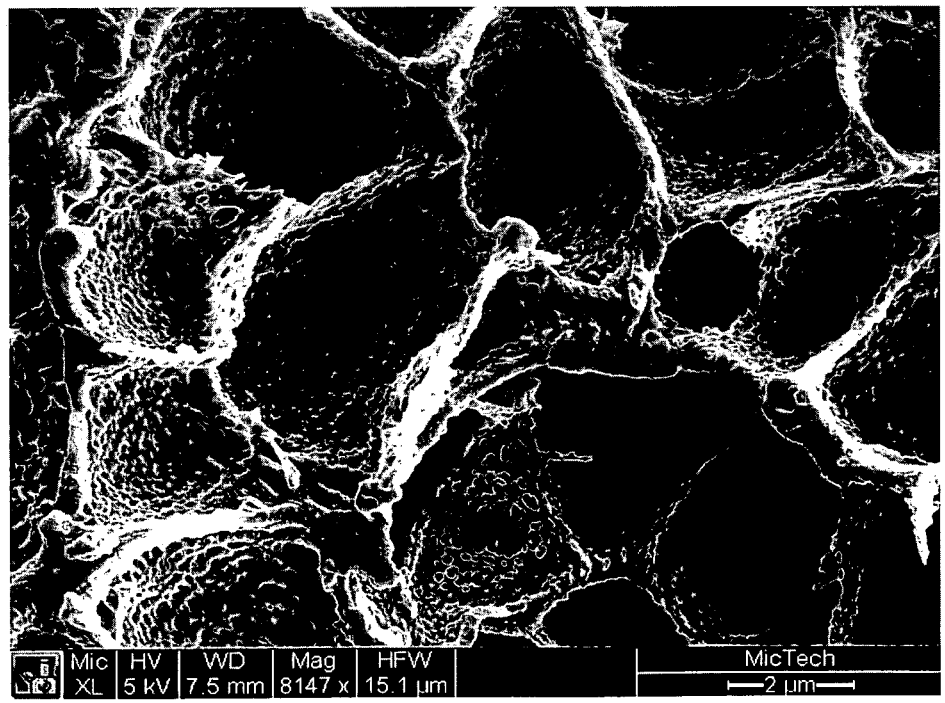
FIG. 20 is a scanning electron micrograph of a foam containing micro-sized cells with nano-sized features on the cell walls in an intrabimodal cellular structure in accordance with the present invention.

Referring to FIGS. 19 and 20, scanning electron micrographs of a cross-sectional view of a polyetherimide foam produced using the heated press method shows a foam having cells of an average cell size of about 4 μm. These micro-sized cells form the primary structure. However, upon closer inspection of the inner cell walls, it was found that the heated press method produced nano-sized features on the cell walls of the larger microcellular features. Some of the nano-sized features create connectivity between the larger micro-sized cells. The heated liquid bath or the heated press with means to allow channeling of the gas from the surfaces produces these bimodal cellular structures. In one embodiment, using a thermoplastic material that is saturated at 1 MPa saturation pressure may be used to make the bimodal structure represented in FIGS. 19 and 20. The structure may be referred to herein as an "intrabimodal" cellular structure. It is believed that an intrabimodal cellular structure may be created having micro-sized cells having an average cell size of greater than 1 μm to 100 μm and having nano-sized features having an average size of 0.1 nm to 500 nm.

Figure 21:
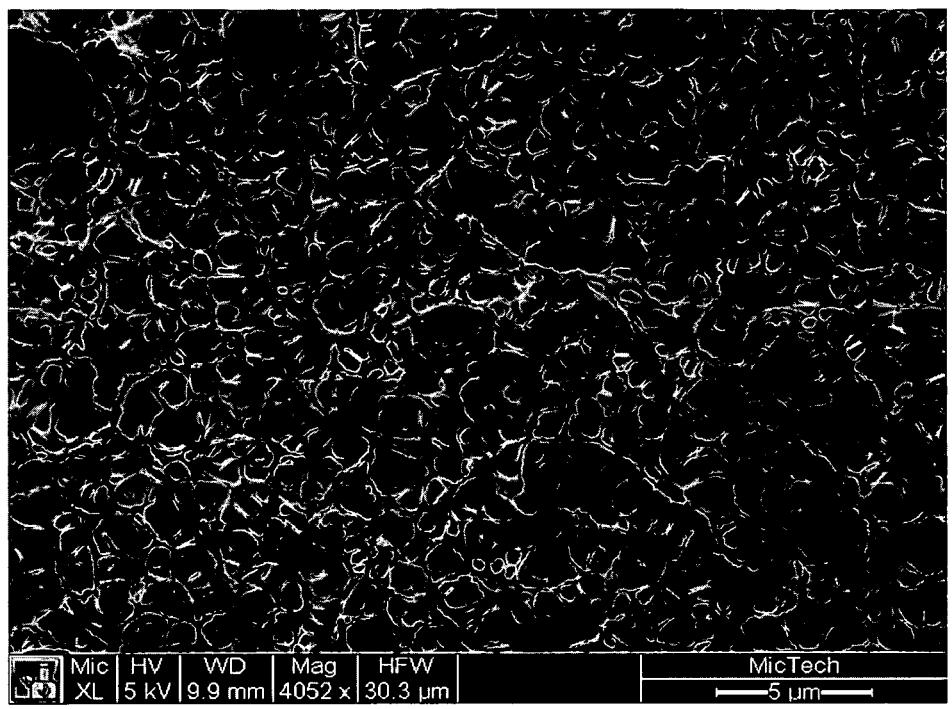
FIG. 21 is a scanning electron micrograph of a foam containing a majority of smaller cells with interspersed larger cells in an interbimodal cellular structure in accordance with one embodiment of the present invention.
Figure 22:
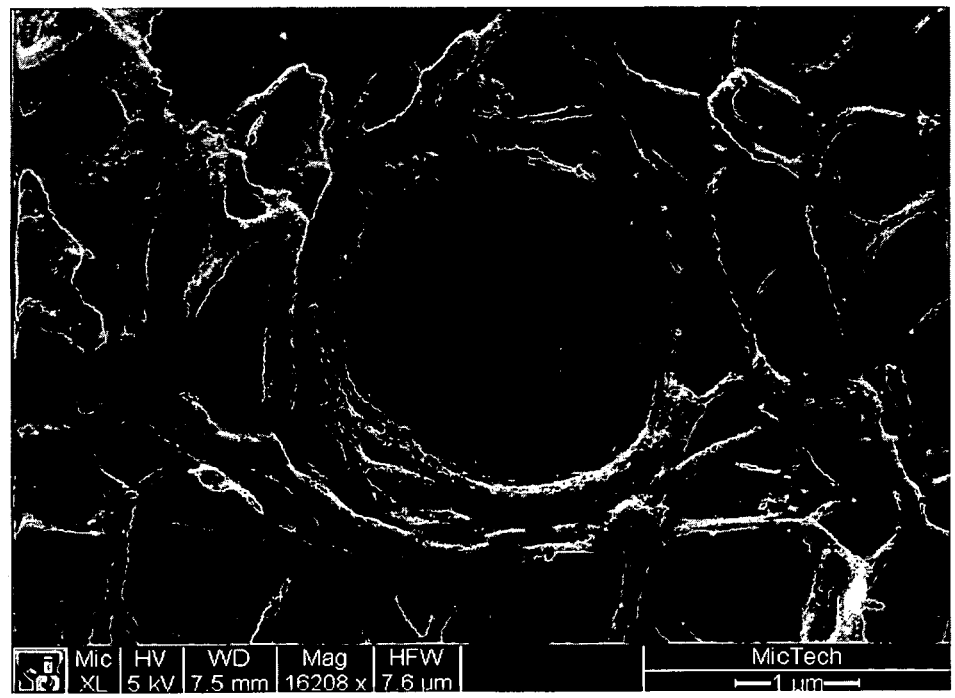
FIG. 22 is a scanning electron micrograph of a foam containing a majority of smaller cells with interspersed larger cells in an interbimodal cellular structure in accordance with one embodiment of the present invention.

Referring to FIGS. 21 and 22, scanning electron micrographs of a cross-sectional view of foamed polyetherimide using a saturation pressure of 4 MPa are shown. Micro-sized cells having a cell size of approximately 2 to 3 μm are interspersed among a majority of nano-sized cells having average cell sizes of less than 1 μm. The heated press method without the use of a breather layer can make this bimodal structure. This bimodal structure has the majority of cells in the 1 to 2 μm range with an evenly distributed secondary structure of cells in the 10 to 15 μm range. These bimodal cellular structures may be referred to herein as "intercellular" bimodal structures. A bimodal structure such as this may have superior mechanical properties to that of foams having either of the two cell sizes alone. It is believed that an interbimodal cellular structure may be created having the smaller cells forming the primary structure with an average cell size of less than 2 μm and the larger cells interspersed throughout the primary structure having cells that have an average cell size of 2 μm to 100 μm.

In another embodiment, a microcellular polyetherimide foam can be created independent of the saturation pressure. At a saturation pressure of 5 MPa and using a breather layer between the hot platens and the thermoplastic material, gas is allowed to escape from the surfaces of the material. The resultant structure is a cellular structure having nano-sized cells. When the material is foamed in the heated press without the use of the breather layer, the foam structure has micro-sized cells. A breather layer can be a porous cloth that allows gas to travel from the surface of the polymer to outside of the press. There are advantages of this process over the conventional bath foaming process, including: (1) the cellular size is determined independent of the saturation step, and (2) at higher pressures, the saturation step requires less processing time to make micro-sized cells. By saturating at 5 MPa instead of 1 MPa, the saturation processing time is reduced by approximately ten days to make microcellular foams. Microcellular foams saturated at 5 MPa can be created that are equivalent in scale to that produced when saturated at 1 MPa. By using this method, the time needed to create microcellular polyetherimide is significantly reduced.

Although polyetherimide has been disclosed as capable of forming nano-sized cells, other thermoplastic polymers are thought to be able to form nano-sized cells. Representative thermoplastic materials that may be useful in accordance with embodiments of the present invention include amorphous polymers and semi-crystalline polymers. Representative compounds include, but are not limited to, thermoplastic urethanes, thermoplastic elastomers, polyethylene naphthalate, polyetherimide, polyetheretherketone, polyphenylene, sulfone, polyamide-imide, polysulfone, polyphenylsulfone, polyethersulfone, polyphthalamide, polyarylamide, polyphenylene sulfide, cyclic olefin copolymer, polyphthalate carbonate, polycarbonate, polyvinylidene chloride, polyurethane, polyphenylene oxide, poly (acrylonitrile-butadiene-styrene), polymethylmethacrylate, crosslinked polyethylene, polystyrene, styrene acrylonitrile, polyvinyl chloride, polybutylene terephthalate, polyethylene terephthalate, polyoxymethylene, polyacetal, polyamide, polyolefin, polyethylene, polypropylene.

Polyetherimide was selected as a representative thermoplastic material for its ability to create a wide range of cell sizes. Polyetherimide has the chemical formula $C_{37}H_{24}O_6N_2$. The monomer molecular weight is 592 g/mol. The molecular weight of a polyetherimide polymer averages 30,000 g/mol. By dividing the polymer molecular weight from the monomer molecular weight, on average there are 51 repeating monomer units per polymer chain.

EXAMPLES

Sample Preparation

Samples for testing density, impact strength, light transmissivity, tensile elongation (strain), and a modified press foaming method were cut from a polyetherimide sheet with a backing film attached to the sheet. All samples had a thickness of 0.06 inches or 1.5 mm. Samples used for a tensile strain test required a secondary operation to cut the samples into a dog-bone shape from the sample blanks. A foot-operated shear press was used to achieve the desired sample dimensions. Samples were cut using the press with the protective polymer film still attached to the samples. After the samples were cut, the surface film layer was removed. Due to the slight brittle nature of polyetherimide, samples were inspected for cracking after the shearing operation. Any samples with surface blemishes or internal cracks were discarded.

Samples for impact testing were created following the recommendations of ASTM D5420 "Standard Test Method for Impact Resistance (Gardner Impact)." The standard specifies that the impact sample be at least 1 inch greater than the diameter of the support plate hole. According to the ASTM standard, the minimum sample size for the test apparatus would then be 1.64"×1.64". Samples measuring 2"×2" were produced in an effort to reduce the effect of shear cutting inducing undetectable defects along the shear edge. Samples for density and light transmissivity testing were sheared from the raw polyetherimide sheet into 1"×1" samples. The small sample size allowed for easy saturation in pressure vessels and provided the required accuracy.

Samples for tensile testing required a further cutting operation to produce the required ASTM dog-bone shape. Blanks were cut to 4.5"×1", followed by a milling operation. The samples for tensile elongation testing were manufactured according to ASTM D638 Type IV specifications. Samples were machined in batches of ten using a TRAK K3E 2-axis CNC knee mill accurate to within 0.001". A 0.5" diameter Swift-Carb™ carbide steel end mill, rotating at 800 rpm, was used to cut the samples.

Samples used for obtaining the mechanical testing results shown in FIGS. 25 to 30 were saturated for at least the time periods shown in Table 1 below in accordance with the saturation pressure used. Samples used in density measurements were foamed at the temperature shown in Table 1 below.

TABLE 1

| PEI Processing Conditions Used for Mechanical Samples | |
|---|---|
| 1 MPa Saturation Pressure | |
| Full Saturation Absorption Time | 22 days |
| Desorption to <1% g $CO_2$/g PEI | 17 days |
| Total Processing Cycle Time | 39 days |
| Relative Density | Foaming Temperature (° C.) |
| 75% | 181 |
| 82.50% | 173.5 |
| 90% | 167 |
| 5 MPA Saturation Pressure | |
| Full Saturation Absorption Time | 12 days |
| Desorption to <1% g $CO_2$/g PEI | 27 days |
| Total Processing Cycle Time | 39 days |
| Relative Density | Foaming Temperature (° C.) |
| 75% | 137 |
| 82.50% | 126 |
| 90% | 113 |

Saturation of Samples

Samples were wrapped in paper towels to assure that gas is absorbed by all surfaces evenly. The wrapped samples were then placed in a pressure vessel and sealed. Carbon dioxide with a 99.9% purity, supplied by Airgas Norpac, was then delivered to the pressure vessel from a high pressure tank. The saturation pressure was controlled by a PID microcontroller to an accuracy of ±0.1 MPa. Samples were then allowed to absorb gas over a predetermined amount of time. After the samples reached full saturation, they were removed from the pressure vessel and allowed to desorb gas before being foamed. The samples were allowed to desorb for 2 minutes before being placed in the foaming bath. All samples used to report on the mechanical properties were prepared using a heated bath process. Samples used in press foaming were placed in a freezer at 0° C. to slow the desorption of gas from the polymer, and then placed in the heated press. The samples were generally at the same gas concentration before foaming.

Foaming Methods

Two methods for foaming samples were used. A hot oil bath was used to foam all of the samples used for density, impact strength, light transmissivity, and tensile characterization. A modified heated press method was used to foam samples for foam characterization. Heated press foaming is advantageous to create flat specimens and to characterize the cellular structures produced by the heated press foaming method.

For oil bath foaming, following a 2-minute desorption period at atmospheric pressure and room temperature, the samples were placed into the METTLER balance to measure gas concentration. At 2.5 minutes, the samples were then placed into a temperature controlled ThermoHaake B5 hot silicon oil bath and foamed for 2.5 minutes. At 5 minutes from depressurization, the samples were removed from the oil bath. Any excess oil was removed from the surface of the samples and the samples were allowed to cool to room temperature. A wire cage was used to house the specimen to keep the sample submerged in the oil bath.

A heated press apparatus included an upper and lower heated platen, a hydraulic pressure cylinder, and a control system. Various processing parameters can be varied via the control system. In heated press foaming, the platens were heated to the desired temperature with the platens in the closed position. Once the platens are at temperature, a sample is removed from the pressure vessel and allowed to desorb for several minutes, generally 2 to 4 minutes, while being transported to the press. However, the desorption times were generally insufficient to substantially change the concentration of gas. Generally, the samples contained substantially the same gas concentration. The heated platens are opened and the sample is placed between the upper and the lower platens at about the center of the platens. The platens are then closed so that the heated surface of the upper platen touches the upper surface of the sample and the heated surface of the lower platen touches the lower surface of the sample. See, for example, FIG. 5. Both the upper and the lower platen make contact with the sample and apply pressure to the upper and lower surfaces of the sample. The foam will then push against the pressure created by the platens in order to foam. Heating occurs on both surfaces of the sample through conduction.

After foaming, the samples were allowed to desorb to a minimum gas concentration before the mechanical properties of the samples were tested.

Desorption

To determine the time required to reach a minimum gas concentration before mechanical testing, desorption tests were performed on samples without undergoing foaming. The samples were removed from the pressure vessel and allowed to sit at room temperature at atmospheric pressure. Periodic weight measurements were taken to record the amount of gas dissolved in the sample using a METTLER AE240 balance. After the samples had desorbed carbon dioxide to a concentration less than 0.01 g $CO_2$/gPEI, they were considered "fully desorbed." The threshold gas concentration for performing mechanical testing is when the concentration is equal to or less than 10 mg carbon dioxide per gram of polyetherimide. The minimum desorption times for the various saturation pressure are listed in Table 2 below.

TABLE 2

Desorption Times Before Mechanical Testing

| Saturation Pressure | Required Desorption Time (Hours) |
|---|---|
| 1 | 400 |
| 2 | 550 |
| 4 | 650 |
| 5 | 650 |

Foam and non-foamed (virgin) samples of polyetherimide were desorbed of gas before being tested for mechanical properties. The threshold gas concentration for mechanical testing was chosen as less than 10 mg carbon dioxide per gram polyetherimide. It was not necessary to allow desorption of foams used for structure characterization. Desorption times required for foams will be less than the values in Table 2 because the foaming process releases gas from the polymer to create the cellular structure and also because gas desorbs faster in a cellular structure. Foamed samples desorbed according to the times in Table 1 will then have a much lower gas concentration than the solid samples. Nevertheless, regardless of the minimum desorption times in Table 2, the foamed samples used in mechanical testing were allowed to desorb for at least 700 hours. After 700 hours, the gas concentration is essentially constant regardless of the saturation pressure used.

Density Measurement

Density evaluation was performed according to ASTM standard D792. The flotation weight loss method uses distilled water as the liquid. The sample is first weighed "dry," and then the sample is placed below the surface of the water and weighed again. Care was taken to avoid that there were no gas bubbles attached to the surface of the sample during the "wet" weight measurement. The equation used to calculate the density of the polymer sample is:

$$D = \left(\frac{W_d}{W_d - W_w}\right) \cdot D_w \quad (1)$$

where,
D=density of the sample
$W_d$=dry weight
$W_w$=wet weight
$D_w$=density of distilled water (taken as 0.9975 g/cm$^3$)

Density is reported as relative density or void fraction. Relative density is the density of the foamed material divided by the density of the unfoamed material. Void fraction is defined as one minus the relative density. Both relative density and void fraction are expressed as a percentage. For example, a material with 60% relative density means that the total volume of the foamed sample is 60% polymer and 40% air.

Light Transmissivity Measurement

As used herein, transmissivity is the fraction of light that passes through a material for a specified wavelength. Transmissivity is calculated as the ratio of the intensity of light that passes through a material divided by the intensity of the light source. The transmissivity value is inversely related to the opacity of the sample. An opaque sample will not allow light to pass through; therefore, it will have a low transmissivity.

Figure 23:
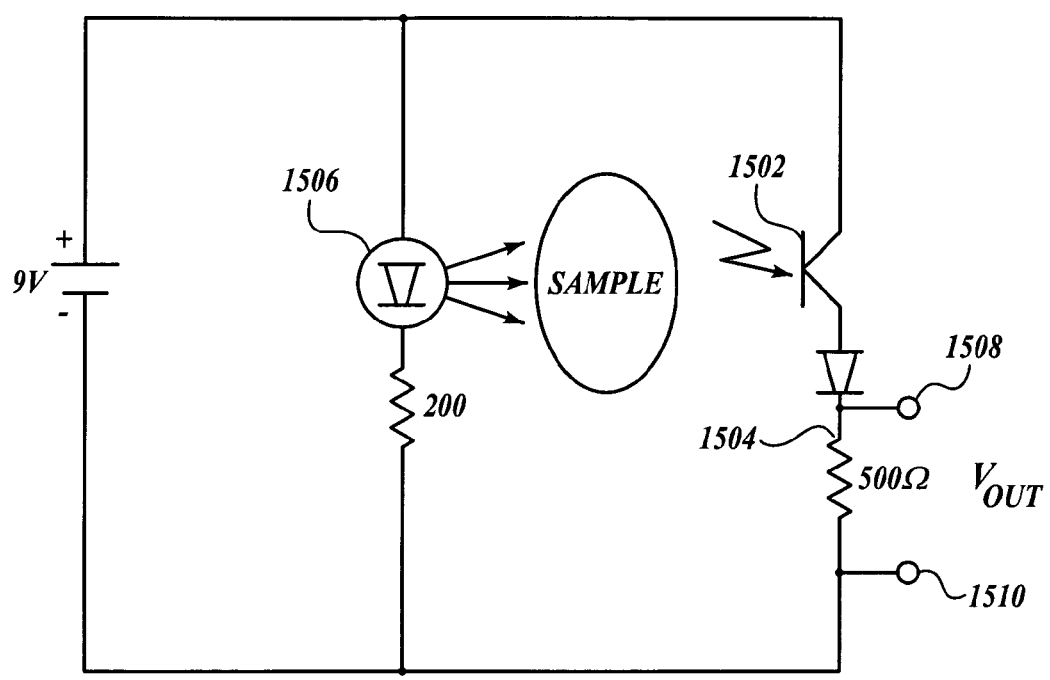
FIG. 23 is a schematic diagram of a device for testing light transmissivity in accordance with one embodiment of the present invention.

FIG. 23 is a schematic circuit diagram of a device that was designed and constructed to test the light transmissivity of materials. The instrument depicted in FIG. 23 emits a specific wavelength of light at a sample and then measures the amount of light that passes through the sample with a photoresistive transistor detector 1502. The voltage drop across the series resistor 1504 is measured and compared to the voltage drop when no sample exists between the emitter 1506 and detector 1502. The ratio of these values is the transmissivity. The circuit illustrated in FIG. 15 was built on a solderless breadboard. A cardboard cover was constructed to shield ambient infrared light from entering the detector 1502 during measurements. The emitter 1506 and detector 1502 were purchased as a matched set of near-infrared light emitting diodes (LEDs). Near-infrared light exists just outside the visible electromagnetic spectrum. The LED emitter 1506 had a peak wavelength of 940 nm. The procedure to measure the transmissivity of a cellular sample is as follows. The cover is placed over the emitter 1506 and detector 1502 and the $V_{out}$ voltage measured between points 1508 and 1510 is recorded. After recording the voltage, the cover is removed and the sample is placed inside the cover, perpendicular to the length and between two sides of the cover, making sure that no gaps exist between the cover and the sample. For example, the sides of the cover may be represented by the parallel lines of the letter "H" such that the sample is represented by the middle perpendicular line. The cover can be a cardboard box with five sides and lacking the bottom side. The inside dimensions of the cover are matched to the dimensions of the sample being tested. The cover with the sample is then placed over the emitter 1506 and detector 1502 so that the sample lies in the path of light between the emitter 1506 and detector 1502. The $V_{out}$ voltage is recorded and the transmissivity is calculated by dividing the sample voltage by the voltage without the sample.

Impact Strength Measurement

Impact strength measurement was performed according to ASTM D5420. The impact strength is a measurement of energy required to break or crack a flat polymer sample by the impact of a falling weight.

The procedure to measure the impact strength of microcellular and nanocellular polyetherimide foam required foaming 2"×2" samples. The ASTM standard calls for a minimum of 20 impact samples for sufficient results, assuming the mean failure height is known. The testing of the polyetherimide samples required 26 samples, including 6 to estimate the mean failure height and 20 to perform measurements.

Measurement of Tensile Strain

Tensile testing generally requires the application of a gradually increasing uniaxial stress until the propagation of a single crack causes failure. Samples for tensile testing were manufactured to ASTM D638 Type IV specifications. Testing of these samples also followed ASTM D638. Tensile testing was performed on an Instron 5585H. In this apparatus, serrated jaws hold the tensile samples. A constant crosshead rate was used to control the amount of stress applied to the polymer samples. The majority of testing was conducted with a crosshead rate of 10 mm/min. Tests were also conducted at a rate of 50, 100, and 200 mm/min. An extensometer with a gage length of 25 mm was employed to measure the initial strain until approximately half the yield stress. After removing the extensometer, strain was recorded from the extension on the Instron crosshead.

Microstructure Characterization

The characterization of microcellular and nanocellular polyetherimide structures was performed by imaging the structures with a scanning electron microscope (SEM). All images were taken on a digital FET Siriron scanning electron microscope. Samples were first scored with a razor blade and freeze fractured with liquid nitrogen. Samples were then mounted in metal stages and the imaged surface was sputter coated with Au—Pd for between 20 to 60 seconds. Accelerating voltages varied between 2 to 10 kV for imaging and both "high resolution" and "ultra-high resolution" detectors were used, depending on the size of the microstructure.

A saturation pressure of 1 MPa was used to create foams having a microcellular structure and a saturation pressure of 5 MPa was used to create foams having a nanocellular structure. FIG. 16 shows the relative density as a function of foaming temperature for saturation pressures of 1 MPa and 5 MPa for polyetherimide foam. The cellular structures were imaged as described above to identify the average cell sizes for the densities used in mechanical testing.

Microcellular samples produced in the density foaming experiments ranged from 96.5 to 28.7% relative density. High density samples were analyzed and average cell size was calculated by averaging the cell size of at least 30 cells. The average cell size of a 91.5% relative density sample was 2.5 µm (see FIG. 18) and the average cell size for a sample of relative density 70.2% was 3.5 µm.

The images of lower relative density microcellular samples show interesting structures below a relative density of approximately 56%. See, for example, FIG. 19. These samples exhibited microcellular structure but, upon closer inspection, the inner cell walls show nano-sized features. The nano-features can best be described as segmented sections of the cell walls where, during bubble growth, polyetherimide molecules remain entangled and bridge the slight radius of the cell wall. FIGS. 19 and 20 support this description of the structure and also show that these nano-features are reduced when cells adjacent to the cell in question push to create flat sections on the cell wall. These flatter sections of the cell show less nano-features than other sections where there is more curvature. In addition to these nano-features, samples with lower densities show that these nano-features create nano-interconnectivity between one microcell to another. The interconnectivity does not take the shape of circular cells but appears as a network or webbing of stretched molecules.

In order to image nanocellular samples using SEM, Au—Pd coating times were reduced to avoid covering the cells. Nanocellular samples had a density range of 70-90% relative density and had cells averaging 20-40 nm, depending on the density. See, for example, FIG. 17 at 69.9% relative density.

Foam Structure Characterization at 4 MPa

Samples treated at a saturation pressure of 4 MPa were formed at various temperatures using the heated oil bath method to study the structure and density of polyetherimide at various foaming temperatures. SEM images of the microstructure of these foam samples are shown in FIGS. 21 and 22. Average cellular sizes ranged from 250 nm to 1 µm. The foam characterization experiments carried out at 4 MPa confirm that in the range of 4-5 MPa, cellular size decreases from 1 µm to 60 nm, depending on foaming temperature.

Internal Blistering

Over the course of experimentation, it was observed that a few samples developed large internal blisters. The formation of large internal blisters in polyetherimide should not be confused with the surface blisters usually observed during the solid state method. Normal surface blistering usually appears when the integral skin of a polymer becomes too weak to support the internal foaming pressure during processing. Surface blistering often occurs when foaming at high temperatures in the attempt to create very low density foam. In contrast to surface blisters, internal blisters originate directly from the center of the sample. In the first 20-30 seconds of foaming, the samples that will later develop internal blisters begin to curl. Samples that exhibit extreme curling during the first half minute of foaming develop internal blisters by the end of the foaming process. Many samples that do not develop blisters will sometimes develop a curl, but this curling is created during the entire 2.5-minute foaming process, not solely in the first 20-30 seconds. During the last 30 seconds of foaming, the internal blisters begin to appear. The internal blisters will often pop in the oil bath when the material creates the large internal cavity of gas. The solid skin and foamed sections around a gas pocket yield to the high pressure of the gas. After removal from the oil bath, defective samples retain the large curvature and the large internal blisters produced while foaming. Internal blisters appeared in samples of all dimensions, including the dog-bone shaped samples for tensile testing.

One possible cause for the internal blistering is a weak mid-plane in the center of the material traveling parallel to the material's surface. The weakened mid-plane could be caused by a defect in the raw material or is a function of the solid-state foaming process. Crack propagation starts perpendicular to the surface, then abruptly changes direction to the mid-plane parallel to the sample surface.

Creation of Flat Foams without Internal Blistering

Because the heated oil bath foaming method often creates slight curvature with larger sample sizes, a modified constrained press foaming method was used to create flat microcellular and nanocellular polyetherimide.

Referring to FIG. 4, a schematic illustration of a prior art constrained press foaming process is illustrated. In this process, shims 406 and 408 can be placed between the upper 402 and lower 404 platen that determine the thickness of the foam 410. The upper 402 and lower 404 platens are prevented from closing beyond the dimension of the metal shims 406 and 408. Heat transfer from the platens 402 and 404 to the sample 410 includes conduction by direct contact of one surface of the sample to a heated platen and by convection of heat from a second platen to the opposite surface of the sample.

Experiments using the prior art press foaming method of FIG. 4 were performed on a variety of sample sizes including 3"×3", 3"×6", and 6"×6". Samples were saturated at 1 MPa until full saturation was reached, based off saturation times presented above. Upon full saturation, samples were removed and placed in a freezer set to 0° C. to slow the process of desorption. Two foaming temperatures were explored in the constrained foaming process including 197° C. and 210° C. Samples were foamed a total of 3 minutes, whereupon the cooling systems were turned on to cool the platens for sample removal. The first foaming runs followed the proposed constrained foaming process developed by Nadella et al. (Nadella, K., Kumar, V., Li, W., "Constrained Solid-State Foaming of Microcellular Panels," *Cellular Polymers*, p. 71, 2005). The constrained foaming method of Nadella et al. sets a fixed thickness based on the estimated thickness after foaming is completed by the use of shims. Samples are slid between the platens and allowed to foam to the top platen. See FIG. 4.

Two variations of the conventional constrained foaming process of Nadella et al. were explored. Polyetherimide samples exhibited a large scrap rate due to internal blistering when allowing to free foam according to the conventional method. One variation illustrated in FIG. 5 included removing the shims and closing the press until both heated platen surfaces touched the surface of the sample. Two modes of operation are possible where the first and second platens 502 and 504 apply a force on respective upper and lower sides of the sample 510. In this mode, heat transfer to the sample 510 is by direct conduction of heat from the upper 502 and lower 504 platens. Samples grew in volume by the driving force exerted on the platens from the expanding gas. In the second variation illustrated in FIG. 6, nylon composite manufacturing breather layers 612, 614 were added between the sample 610 and the platen surfaces 602, 604.

The density of the samples foamed by the conventional constrained foaming process matched that of the samples produced by the oil bath process. However, 100% of the samples developed large internal blisters. The creation of internal blisters occurred early in the over-all foaming process before the foamed sample reached the top platen surface. One solution was to close the platens to touch the surfaces of the sample without shims and allowing the foam to expand against the force of the platens as illustrated in FIG. 5. This modification resulted in improved quality, and the scrap rate decreased. Despite this improvement, many parts still had a number of irregularities. Only a small fraction of the "good" foams had a smooth surface. Many foams foamed without the use of shims had irregular volumetric expansion during foaming.

The effect of closing the platens entirely on the saturated sample created an overall flatness of the samples with many samples having a smooth surface. Scrap parts of this process had small internal blisters in addition to indents on the surface. It is assumed that the surface indents were caused by the collection of gas escaping from the surface of the polymer during foaming. To avoid the formation of internal blisters and surface deformations, a breather layer was placed between the sample surface and platen surface to allow for gas to escape as the gas desorbed from the sample during foaming as illustrated in FIG. 6. A breather layer was obtained from a composite manufacturing lab and included a woven nylon fabric having a thickness of approximately 0.5 mm. The use of a breather layer created a surface texture on the samples, but reduced the amount of scrap due to internal blistering to below 25%. Allowing the gas to escape from the surface of the polymer unobstructed seems to decrease the scrap rate. Additionally, applying greater pressure on one area and reduced pressure across another area creates a pressure gradient that prevents foaming in the higher pressure area. Samples were produced that had sections of foam and sections of unfoamed, solid material.

Mechanical Testing

Saturation pressures of 1 MPa and 5 MPa were chosen to create microcellular and nanocellular samples, respectively. Saturated samples were then placed in the heated oil bath for foaming into cellular structures. A comparison of mechanical properties of cellular structures ranging from 20 nm to 3 µm could then be studied. Experiments to evaluate the mechanical properties were run using the processing parameters for absorption and foaming temperatures shown in Table 1. The desorption time was set at 700 hours regardless of saturation pressure. The relative density range between 75-90% was chosen to reduce the effect of internal blistering. Three variations of density were chosen at 75%, 82.5%, and 90% relative density.

Light Transmissivity Results and Discussion

Figure 24:
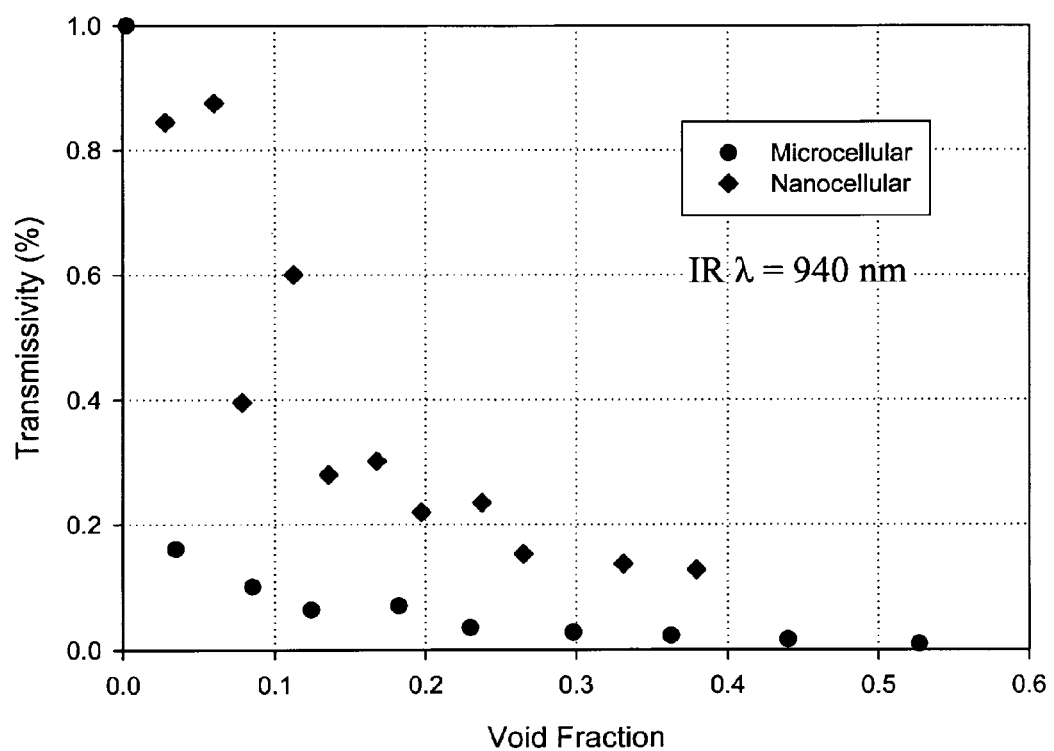
FIG. 24 is a graph of light transmissivity of microcellular and nanocellular foams as a function of void fraction.

FIG. 24 shows the infrared light transmissivity as a function of relative density for microcellular and nanocellular foam samples. The data shown in FIG. 24 indicate that transmissivity is a function of the cell size. The transmissivity value shown in FIG. 24 is also a function of the thickness of the sample. Both cell size and sample thickness were not held constant over the range of void fractions reported. The thicknesses of the samples increased with void fraction, as can be expected, although both microcellular and nanocellular thickness grew at relatively the same rate. The actual values of transmissivity reported in terms of the rate and range of transmissivity change cannot be compared to data outside of this experiment, but can still be used as a comparison between the two sets of samples tested. Cellular sizes also increased within the reported micro and nano ranges with increasing void fractions. Although this will alter the absolute value of transmissivity, the comparison between the micro and nano ranges can still be made. Both the increase in thickness and cell size will prematurely decrease the absolute value of transmissivity over the ranges investigated.

The optical behavior of the nanocellular structures can be explained in part by a series of equations governing electromagnetic scattering developed by Lord Rayleigh. These equations demonstrate that the intensity of scatter is dependent on the wavelength of light and even more so by the diameter of the scattering particle. The dependence on the wavelength shows that certain wavelengths are more easily scattered. In the visible spectrum, violets and blues are more easily scattered than red wavelengths.

A color change in the nanocellular plastic is hard to identify due to the amber color of the material, but when the sample is held to a white light source, the light that passes through the material is red in color. Subjective to the observer is the slight hue of blue color in the high density nanocellular samples. It is then hypothesized that if the starting polyetherimide material had no color, nanocellular foamed polyetherimide would then be slightly blue in color. This provides a method to create color in a polymer without the addition of extra pigments or pigmentation agents, or of a method to filter light of a certain wavelength.

Based on the data of FIG. 24, it can be concluded that there is a difference between the transmissivity of microcellular polyetherimide and nanocellular polyetherimide. Cell size has a dramatic effect on the amount of light scattering through the material. The transmissivity of infrared light as a function of void fraction shows that nanocellular material allows more light to pass through a sample. This experiment supports the idea that the optical transparency of foams can be adjusted by controlling the size of the cells. When the cells are sufficiently small, the thermoplastic foam may be essentially 100% transparent.

Impact Strength Results and Discussion

Standard unfoamed unsaturated polyetherimide samples were first tested to benchmark the behavior of polyetherimide. The mean energy for breakage was calculated according to ASTM D5420. Foam samples with densities of 75, 82.5, and 90% relative density were then created with microcellular and nanocellular structures. After the foamed samples were allowed to desorb, they were impact tested. Impact results for foams can be displayed in many ways. The units presented for impact energy can be in joules, joules per millimeter, and joules per millimeter per density.

Figure 25:
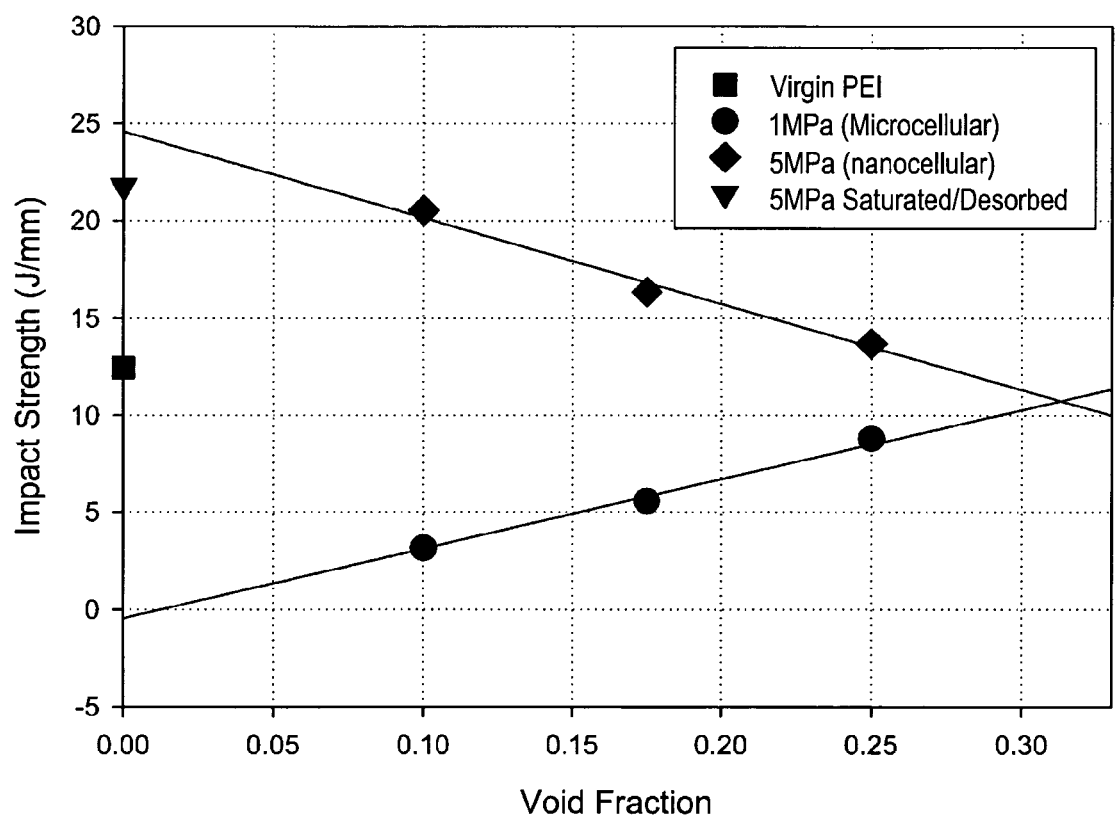
FIG. 25 is a graph of the impact strength of virgin polyetherimide; microcellular foam polyetherimide, nanocellular foam polyetherimide, and saturated and desorbed polyetherimide.

Impact strength is dependent on the thickness of the sample. The raw value for impact energy can be divided by the average thickness of the samples to get impact energy per thickness. In increasing the void fraction of a sample, the overall dimensions of the sample will enlarge. The thicknesses of the samples are then a function of the beginning sample thickness and the degree of foaming. FIG. 25 shows a graph of the impact energy compensated for the change in thickness during foaming. FIG. 25 shows the impact strength in joules/mm as a function of void fraction for the three foam densities, virgin polyetherimide and a treated solid polyetherimide that was treated by saturating the sample with gas and then allowing desorption of the gas.

From FIG. 25, a difference in the impact strength between solid (square data point) and foam (circle and diamond data points) polyetherimide, as well as a difference between the two cellular structures, is evident. Additionally, the trends of the least squares linear fit show that there is a convergence of impact strength between the two cellular structures. Both cellular structures and virgin polyetherimide all have the same impact strength between void fractions of approximately 25-30%. It is interesting to note that the nanocellular 10% void fraction sample reached the limits of the testing apparatus such that 50% of the samples broke at the limit value. According to the ASTM standard, the mean breakage is defined where 50% of the total samples break.

The impact strength of microcellular polyetherimide shows an increase in strength with an increase in void fraction in FIG. 25.

In another experiment, polyetherimide samples were prepared by saturating the samples at a pressure of 5 MPa with carbon dioxide and then allowed to fully desorb of gas. The impact samples were then tested according to ASTM D5420. FIG. 25 also shows the impact strength of solid samples of polyetherimide having been saturated and then desorbed of gas (triangle data point). The saturated and desorbed solid polyetherimide sample had the highest impact strength of all of the samples tested. Unlike the nanocellular samples, saturated and desorbed samples did not have any breakage. This indicates that the actual value for the impact energy of the saturated and desorbed polyetherimide is significantly higher than what is reported. The value shown in FIG. 25 is slightly higher than the 10% void fraction nanofoam because the saturated and desorbed sample did not grow in thickness. Since saturated and desorbed polyetherimide had no observable breakage, it is hypothesized that the actual impact strength would be closer to where the linear best-fit line intersects the vertical axis in FIG. 25. Impact testing showed that saturation and desorption of carbon dioxide gas has an effect on the impact strength of the polymer. Saturated and desorbed polyetherimide samples had the highest impact resistance overall and saw a doubling of impact resistance to that of neat polyetherimide.

Tensile Elongation (Strain) Results and Discussion

Figure 26:
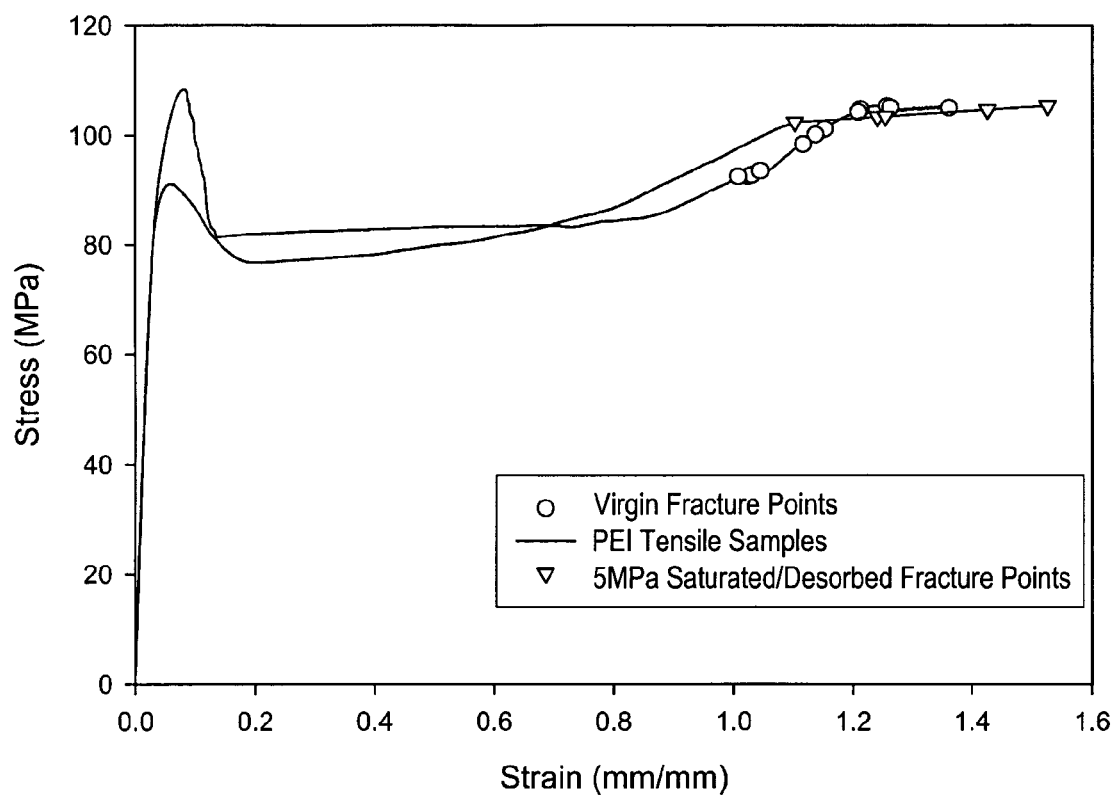
FIG. 26 is a graph of the stress/strain curve of virgin polyetherimide and saturated and desorbed polyetherimide.

The tensile experiment tested virgin samples, saturated and desorbed samples, microcellular samples, and nanocellular samples of polyetherimide. Foamed samples were tested at three densities including 90%, 82.5%, and 75% relative density. All tensile characterization tests were performed at a strain rate of 10 mm per minute unless otherwise noted. The results of the virgin and 5 MPa saturated and desorbed polyetherimide tensile samples are shown in FIG. 26. Tensile results are displayed by a solid curve representing the cumulative stress-strain curves for each condition with fracture points indicating the point of individual sample fracture. Referring to FIG. 26, the effect of saturation and desorption with 5 MPa carbon dioxide is a lowering of the yield strength. The strain at break observed overlaps for both sets of samples and shows that saturation and desorption has little to no effect on strain at break.

Figure 27:
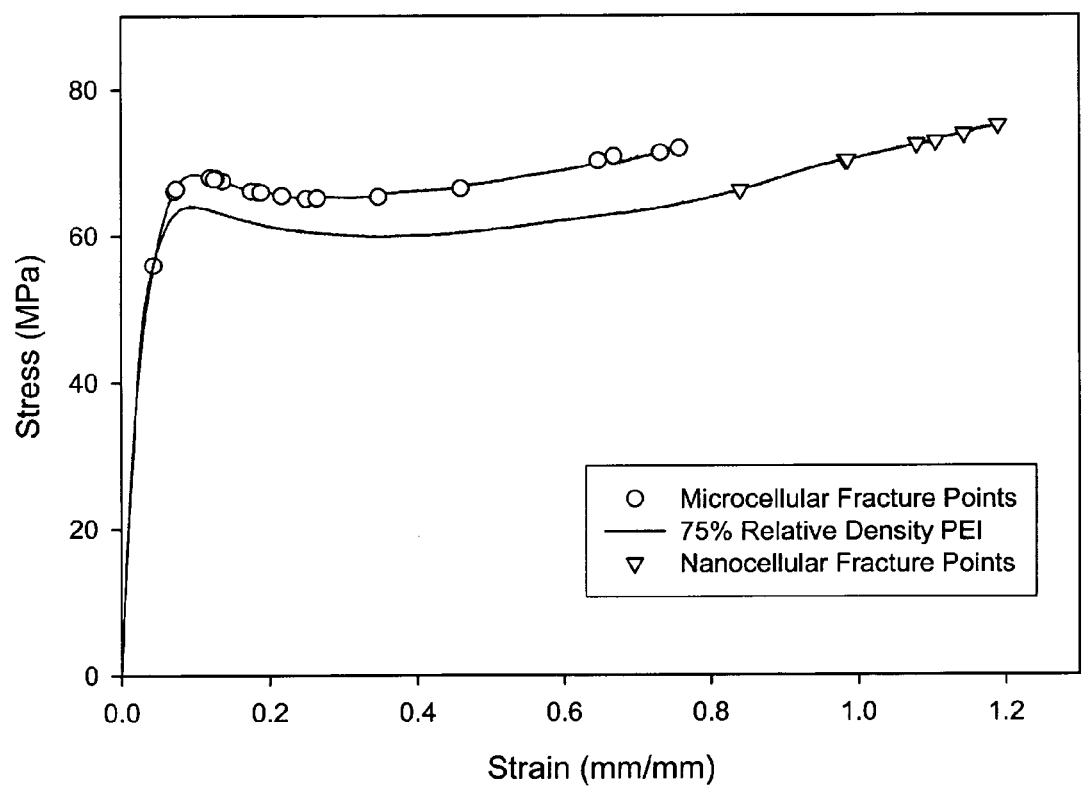
FIG. 27 is a graph of the stress/strain curve of microcellular and nanocellular polyetherimide foam at a relative density of 75%.
Figure 28:
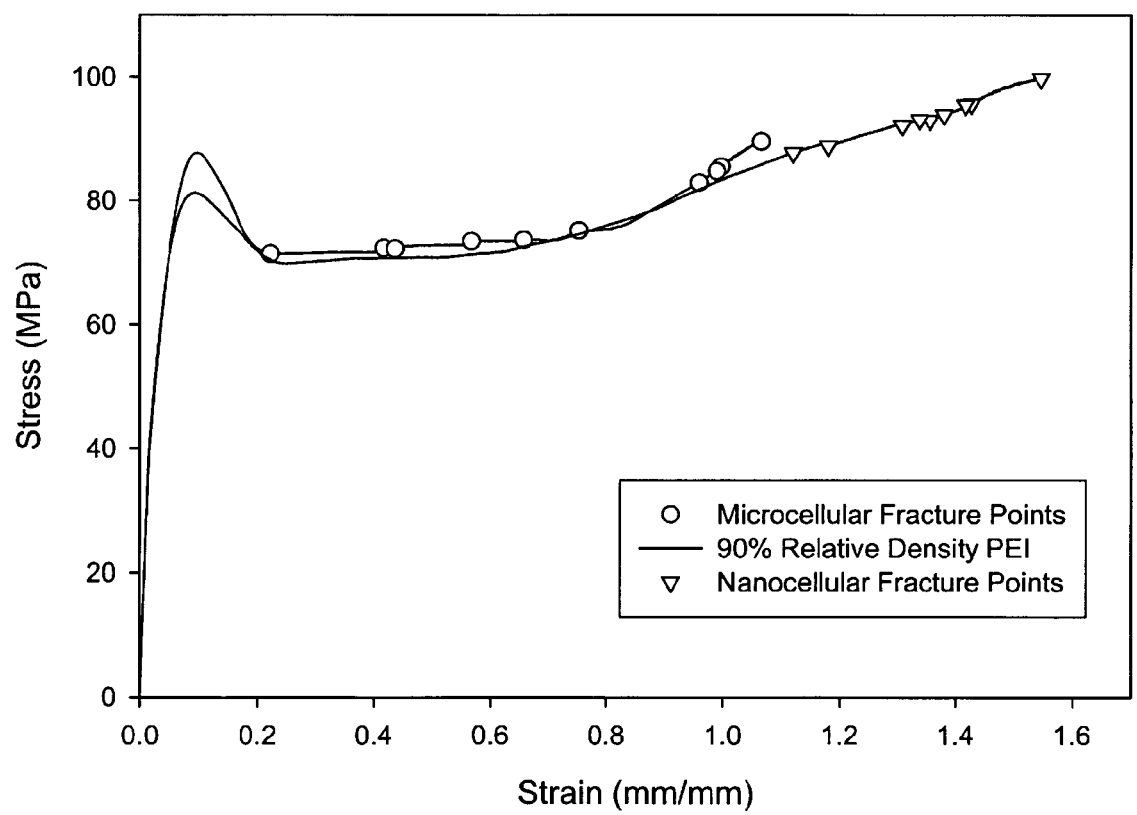
FIG. 28 is a graph of the stress/strain curve of microcellular and nanocellular polyetherimide foam at a relative density of 90%.
Figure 29:
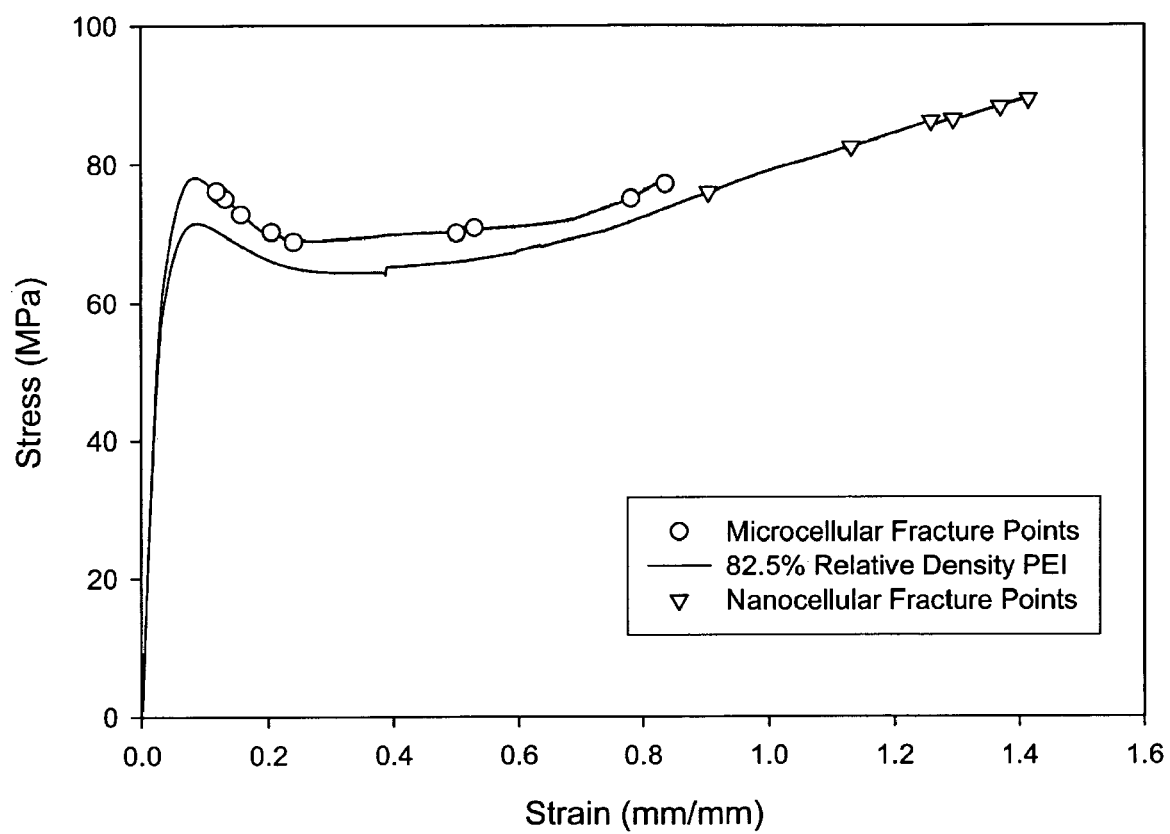
FIG. 29 is a graph of the stress/strain curve of microcellular and nanocellular polyetherimide foam at a relative density of 82.5%.

Microcellular and nanocellular polyetherimide tensile samples were then tested. The data plots are shown in FIGS. 27-29 with the fracture points of each sample shown as an open circle for microcellular structures and an open triangle for nanocellular structures.

The data collected from the tensile tests was then used to calculate the mean/standard deviation of strain at break.

Mean and Standard Deviation of Strain at Break and Discussion

Figure 30:
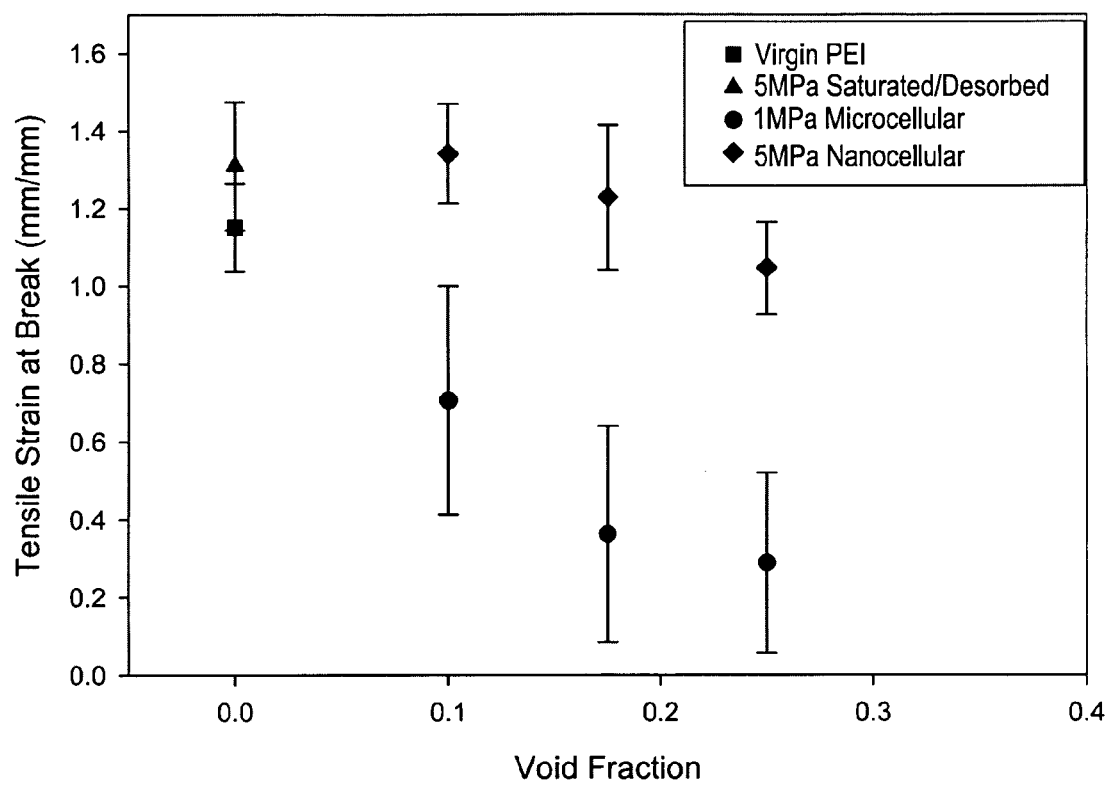
FIG. 30 is a graph of the tensile strain at break of virgin polyetherimide, saturated and desorbed polyetherimide, microcellular polyetherimide foam, and nanocellular polyetherimide foam as a function of void fraction.

The strain at break is the measure of stretch the gage section of the tensile dog-bone sample undergoes during the course of the tensile test. Often it is desirable to have a material that has a high value of strain at break because the stretching of the polymer allows for energy absorption and allows for less drastic failure mode. The difference in mean and standard deviation of the tensile strains between the microcellular structures and nanocellular structures is visible in the stress-strain curves illustrated in FIG. 30. FIG. 30 shows a difference between the means of the strain at break as well as a difference in size of the deviation bars. The nanocellular samples exhibit greater tensile strain (elongation) than microcellular samples. In addition, nanocellular samples have a tighter cluster of break points. The smaller the variation in break points, the more reliable the foam is under tensile loading. Shown in the stress-strain curves, three microcellular samples of 75% relative density did not even strain past the yield point. The higher reliability of the nanocellular structure could provide greater value over microcellular polyetherimide to a design engineer by providing a predictable increased energy absorption and visual plastic deformation before breakage.

The strain behavior of the samples gives some insight into the micro-molecular behavior during tensile testing. During the plastic deformation region beyond the yield stress, amorphous polymers, such as polyetherimide, allow their molecules to stretch. It appears that the cell size of the microcellular samples hampers the stretching of the amorphous molecules. Nanocells allow for much more stretching. The size of the nanocells is within the range of the length of a single polymer chain. Many polymers like that of polyetherimide have molecular chains of lengths in the tens to hundreds of nanometers. The length of the molecules as compared to the size of the cells allows for a single molecule to stretch from one side of a nanocell to the other and beyond. This nanocellular structure may be the cause of the tensile trends observed.

The last quality measure from the stress-strain curve is the toughness. The toughness is a combination of the stress and strain at break for the samples observed. Since nanocellular structures allow for greater stresses and strains, the toughness of the nanocellular material is vastly improved over microcellular polyetherimide. The largest increase of nanocellular polyetherimide over microcellular appeared at 75% relative density in that nanocellular material was 3.8 times tougher than microcellular material of the same density.

The mean strain at break was increased for nanocellular polyetherimide and the standard deviation of the strain at break was significantly decreased. This allowed for a large increase in the toughness of the nanocellular material as it is a function of stress and strain. It is hypothesized that nanocellular polyetherimide has more strength than microcellular polyetherimide due to the ratio of cell size to molecular length. One molecule is able to bend around the circumference of a single cell and entangle with other molecules on both sides of the cell.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for making a cellular thermoplastic material, comprising:
   obtaining a thermoplastic material impregnated with gas, wherein the material includes a surface defining a length/width plane and the material has a thickness;
   placing the material within a press;
   applying a three to the material with the press normal to the surface, wherein the force produces friction between the surface and the press to generally cause expansion in the thickness dimension and prevent expansion in the length/width plane.

2. The method of claim 1, wherein more than one thermoplastic material is placed within the press.

3. The method of claim 1, wherein more than one thermoplastic material is saturate with gas, wherein a porous media is interleaved between thermoplastic materials.

4. The method of claim 1, wherein the foam thermoplastic material is greater than 3 mm in thickness.

5. The method of claim 1, wherein the foam thermoplastic material is 6 mm in thickness or greater.

6. The method of claim 1, further comprising:
   heating the press to form cells in the material; and
   channeling the gas desorbing from the material away from the material through a gas channeling means that is provided within the press to provide a cellular material substantially free of internal blistering and surface deformations.

7. A method for making a composite structure including a thermoplastic foam, comprising:
   obtaining a thermoplastic material and a facesheet;
   impregnating the thermoplastic material with a gas;
   allowing the gas-impregnated thermoplastic material to desorb gas at the surfaces thereof;
   applying an adhesive on at least one surface of the gas-impregnated thermoplastic material or the facesheet or both;
   placing the facesheet on the thermoplastic material;
   placing the gas-impregnated thermoplastic material with adhered facesheet within a press; and
   heating the press to cure the adhesive, create a cellular structure in the thermoplastic material impregnated with gas, and form a thin integral solid skin at the surfaces of the thermoplastic material that are desorbed of gas.

8. The method of claim 7, further comprising applying an adhesive to a second surface of the gas-impregnated thermoplastic material or second facesheet and placing the second facesheet on the second surface.

9. The method of claim 7, wherein the press is heated to a temperature to cure the adhesive.

10. The method of claim 7, further comprising selecting one of saturation pressure, saturation time, or desorption time to control the density of the cellular structure in the thermoplastic material.

\* \* \* \* \*

UNITED STATES PATENT AND TRADEMARK OFFICE
CERTIFICATE OF CORRECTION

PATENT NO. : 8,092,626 B2  
APPLICATION NO. : 12/047263  
DATED : January 10, 2012  
INVENTOR(S) : K. Nadella et al.

Page 1 of 1

It is certified that error appears in the above-identified patent and that said Letters Patent is hereby corrected as shown below:

Title page, Item (74), Attorney, Agent, or Firm "Christensen, O'Connor, Johnson, Kindness, PLLC" should read --Christensen O'Connor Johnson Kindness PLLC--

Column 31 (Claim 1, line 7) "three" should read --force--

Column 31 (Claim 3, line 2) "saturate" should read --saturated--

Signed and Sealed this
Sixteenth Day of October, 2012

David J. Kappos
*Director of the United States Patent and Trademark Office*

UNITED STATES PATENT AND TRADEMARK OFFICE
CERTIFICATE OF CORRECTION

PATENT NO.         : 8,092,626 B2                                   Page 1 of 1
APPLICATION NO.    : 12/047263
DATED              : January 10, 2012
INVENTOR(S)        : K. Nadella et al.

It is certified that error appears in the above-identified patent and that said Letters Patent is hereby corrected as shown below:

Title page, Item (74), Attorney, Agent, or Firm "Christensen, O'Connor, Johnson, Kindness, PLLC" should read --Christensen O'Connor Johnson Kindness PLLC--

Column 31, line 9 (Claim 1, line 7) "three" should read --force--

Column 31, line 17 (Claim 3, line 2) "saturate" should read --saturated--

This certificate supersedes the Certificate of Correction issued October 16, 2012.

Signed and Sealed this
Thirteenth Day of November, 2012

David J. Kappos
*Director of the United States Patent and Trademark Office*